(12) United States Patent
Mizuochi et al.

(10) Patent No.: US 11,401,696 B2
(45) Date of Patent: Aug. 2, 2022

(54) WORK MACHINE

(71) Applicant: HITACHI CONSTRUCTION MACHINERY CO., LTD., Tokyo (JP)

(72) Inventors: Mariko Mizuochi, Hitachinaka (JP); Hiroshi Sakamoto, Kashiwa (JP); Kazushige Kurokami, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 340 days.

(21) Appl. No.: 16/641,714

(22) PCT Filed: Dec. 13, 2018

(86) PCT No.: PCT/JP2018/045991
§ 371 (c)(1),
(2) Date: Feb. 25, 2020

(87) PCT Pub. No.: WO2019/117268
PCT Pub. Date: Jun. 20, 2019

(65) Prior Publication Data
US 2020/0217049 A1 Jul. 9, 2020

(30) Foreign Application Priority Data
Dec. 14, 2017 (JP) .............................. JP2017-239979

(51) Int. Cl.
*E02F 9/26* (2006.01)
*B60Q 5/00* (2006.01)
(Continued)

(52) U.S. Cl.
CPC .............. *E02F 9/261* (2013.01); *B60Q 5/006* (2013.01); *B60Q 9/008* (2013.01); *E02F 3/32* (2013.01);
(Continued)

(58) Field of Classification Search
CPC .... E02F 3/32; E02F 9/24; E02F 9/261; G01S 19/14; G01S 19/396; G01S 19/42;
(Continued)

(56) References Cited

U.S. PATENT DOCUMENTS 9,230,419 B2 * 1/2016 Beggs ................... G08B 21/18
9,875,635 B2 * 1/2018 Sawada ................. G08B 21/18
2014/0361903 A1 12/2014 Sawada

FOREIGN PATENT DOCUMENTS

JP 07-168985 A 7/1995
JP 3085662 B2 9/2000
(Continued)

OTHER PUBLICATIONS

International Search Report of PCT/JP2018/045991 dated Mar. 5, 2019.
(Continued)

*Primary Examiner* — Tyler J Lee
(74) *Attorney, Agent, or Firm* — Mattingly & Malur, PC

(57) ABSTRACT

An operator of a hydraulic excavator and a worker working outside of the hydraulic excavator carry a worker tag that sends a radio-wave signal including a magnetic field ID, a tag ID, and positional information obtained by a GNSS receiving section in case the worker tag receives a magnetic field signal generated by a magnetic field detecting device mounted on the hydraulic excavator. Based on positional information of the hydraulic excavator that is obtained from an GNSS receiving device and positional information of the worker tag, the position of the worker tag is calculated. In case the worker tag is detected in a proximity notification target area, a notification command is generated for notifying the operator of the hydraulic excavator of the detection of the worker tag, and output to a notification device in the cabin of the hydraulic excavator. Thus, a worker who is in (Continued)

proximity to the work machine is accurately detected, and the operator is prevented from being excessively alerted.

7 Claims, 18 Drawing Sheets

(51) Int. Cl.
    *B60Q 9/00*     (2006.01)
    *E02F 3/32*     (2006.01)
    *E02F 9/24*     (2006.01)
    *G01S 19/14*     (2010.01)
    *G01S 19/42*     (2010.01)

(52) U.S. Cl.
    CPC .............. *E02F 9/24* (2013.01); *G01S 19/14* (2013.01); *G01S 19/42* (2013.01)

(58) Field of Classification Search
    CPC ....... G01S 19/51; H04W 4/023; H04W 4/025; H04W 4/40; G08B 21/22; B60Q 5/006; B60Q 9/008
    See application file for complete search history.

(56) References Cited

FOREIGN PATENT DOCUMENTS

| | | |
|---|---|---|
| JP | 2003-105807 A | 4/2003 |
| JP | 2012-053515 A | 3/2012 |
| JP | 5009139 B2 | 8/2012 |
| JP | 2014-031660 A | 2/2014 |
| JP | 5520688 B2 | 6/2014 |
| JP | 5835577 B2 | 12/2015 |

OTHER PUBLICATIONS

International Preliminary Report on Patentability received in corresponding International Application No. PCT/2018/045991 dated Jun. 25, 2020.

* cited by examiner

FIG. 6

INDUCED MAGNETIC FIELD INFORMATION

| MAGNETIC FIELD ID |
|---|

FIG. 7

TAG INFORMATION

| TAG ID | RECEIVED MAGNETIC FIELD ID VALUE | RECEIVED GNSS DATA |
|---|---|---|

| MEASURED GNSS QUALITY INFORMATION | CALCULATED THREE-DIMENSIONAL POSITION VALUE |
|---|---|

FIG. 8

DETECTED TAG INFORMATION

| MAGNETIC FIELD ID | DETECTED TAG LIST |
|---|---|

| DETECTED TAG A | DETECTED TAG B | ... |
|---|---|---|

| TAG ID | RECEIVED GNSS DATA | TAG ID | RECEIVED GNSS DATA | ... |
|---|---|---|---|---|

FIG. 9

WORKER POSITION INFORMATION

| WORKER POSITION INFORMATION (FIRST WORKER) || WORKER POSITION INFORMATION (SECOND WORKER) || ... |
|---|---|---|---|---|
| WORKER ID | CALCULATED WORKER POSITION VALUE | WORKER ID | CALCULATED WORKER POSITION VALUE | ... |

FIG. 10

WORKER PROXIMITY INFORMATION

| WORKER PROXIMITY INFORMATION (FIRST WORKER) ||| WORKER PROXIMITY INFORMATION (SECOND WORKER) ||| ... |
|---|---|---|---|---|---|---|
| WORKER NAME | WORKER ATTRIBUTE | PRESENCE AREA | WORKER NAME | WORKER ATTRIBUTE | PRESENCE AREA | ... |

WORK MACHINE

TECHNICAL FIELD

The present invention relates to a work machine.

BACKGROUND ART

Work sites where work machines such as hydraulic excavators, wheel loaders, etc. are used need to take on various tasks about safety of work operations. For example, it is an important duty to be performed for industrial safety to prevent physical contact between work machines and workers. There has been known, as a technology for preventing physical contact between work machines and workers, a system in which an infrared sensor or an ultrasonic sensor installed on a work machine detects distance between the work machine and a worker positioned around the work machine, and an alert is issued based on the detected distance. However, since infrared rays and ultrasonic waves are susceptible to sunlight, air pressure, humidity, etc. in the work environment of the work machine, the system is liable to cause detection errors. Furthermore, as it is difficult for the system to identify detected objects as workers or materials or structures, concerns are raised about the accuracy of detection and the frequency of alerts. In view of these difficulties, there have been developed systems that detect a worker by reading an ID (identification) signal from an RFID tag carried by the worker via wireless communications that are less subject to the work environment.

Patent Document 1, for example, discloses a system for detecting a worker using an RFID (Radio Frequency IDentification) tag. In the disclosed system, a worker carries an RFID tag that emits radio waves over a predetermined communication distance, and a receiver disposed on a work machine receives radio waves from the RFID tag. The system issues an alert by detecting the worker who has approached the work machine within the predetermined communication distance. Furthermore, Patent Document 2 reveals a system in which an RFID tag carried by a worker has a function to change magnetic field detection sensitivities, and identifies the distance between a work machine and the worker as several stages, so that alert levels are changed depending on the distance.

Furthermore, Patent Documents 3 and 4 disclose a system in which a GNSS (Global Navigation Satellite System) receiver for receiving signals from positioning satellites of a GNSS is mounted on a work machine, a GNSS signal reception terminal having a GNSS signal receiving function is carried by a worker, and the work machine and the worker as they are in close proximity to each other are detected by acquiring respective positional information of the work machine and the worker using the GNSS, indicating the nearness to the operator of the work machine.

PRIOR ART DOCUMENT

Patent Documents

Patent Document 1: Japanese Patent No. 5009139
Patent Document 2: Japanese Patent No. 5835577
Patent Document 3: Japanese Patent No. 3085662
Patent Document 4: Japanese Patent No. 5520688

SUMMARY OF THE INVENTION

Problems to be Solved by the Invention

Incidentally, in case a worker who is approaching a work machine is to be indicated to an operator of the work machine by an alert or the like, it is necessary to adequately detect the worker in close proximity to the work machine and also to be careful enough not to excessively alert and bother the operator.

For preventing the operator from being excessively alerted, it is important, for example, to appropriately adjust an area where the presence of a worker with respect to the work machine is to be detected and a worker presence alert is to be issued to the work machine, in various situations. According to the prior art disclosed in Patent Documents 1 and 2, nothing is taken into consideration about adjusting the area where the presence of a worker is to be detected and a worker presence alert is to be issued to the work machine, so that the operator tends to be excessively alerted and felt bothered, possibly resulting in a reduction in working efficiency. According to Patent Document 1, it is detected whether a worker has entered a predetermined distance from the work machine or not. According to Patent Document 2, the distance of a worker from the work machine is detected. However, since the positional relationship between the work machine and the worker, i.e., information about the distance and direction, is not obtained, the area where a worker presence is to be detected and a worker presence alert is to be issued cannot be adjusted to a nicety.

Furthermore, according to the prior art disclosed in Patent Documents 3 and 4, information about the positional relationship between the work machine and the worker (the distance and direction) can be obtained. However, if at least one of the GNSS receiving section on the work machine and the GNSS reception terminal carried by the worker is unable to receive signals from positioning satellites, then no positional information is obtained, and the worker who is in close proximity to the work machine cannot be detected. Moreover, the positional information that is obtained may possibly suffer large errors due to delays in propagation of radio waves owing to a satellite layout and characteristics of radio-wave propagation routes, and reflections of radio waves caused by walls, buildings, other machines, materials, and so on. Such errors of the positional information may lead to a failure of worker detection and notification and also notice errors.

The present invention has been made in view of the above problems. It is an object of the present invention to provide a work machine which is capable of accurately detecting a worker approaching the work machine and also of preventing itself from excessively alerting the operator thereof.

Means for Solving the Problems

The present application includes a plurality of means for achieving the above objects. According to one example, there is provided a work machine having a machine body with a propulsive device, a multi-joint work implement mounted on the machine body and including a plurality of front members that are angularly movably interconnected, and an operating device for outputting operating signals for operating the work implement, including a GNSS receiving device mounted on the machine body for acquiring positional information of the work machine, at least one magnetic field generating device fixed to the machine body at a predetermined position, for generating a magnetic field signal including a magnetic field ID for identifying a source for generating the magnetic field signal, a tag information receiving device for receiving a radio-wave signal sent from at least one worker tag carried by the operator of the work machine and a worker working outside of the work machine and having a GNSS receiving section for acquiring positional information of the worker tag, the worker tag being responsive to the magnetic field signal generated by the magnetic field generating device for sending the radio-wave signal that includes at least the magnetic field ID included in the received magnetic field signal, a tag ID for allowing the worker tag that has received the magnetic field signal to identify itself, and positional information of the worker tag, a tag detecting device controller for controlling the magnetic field generating device with a detection command, acquiring information included in the radio-wave signal received by the tag information receiving device, and outputting the acquired information as detected tag information, and a controller for determining a detection target area where a position of a worker tag with respect to the work machine is a detection target, and a proximity notification target area where proximity of a worker tag is a proximity notification target in the detection target area, calculating the position of a worker tag based on the positional information of the work machine, the positional information of the worker tag, the detected tag information acquired by the tag detecting device control section, and the detection target area, and generating a notification command and outputting the generated notification command to a notification device to notify the operator of the work machine of the detection of the worker tag in case the worker tag is detected in the proximity notification target area.

Advantages of the Invention

According to the present invention, a work machine is capable of accurately detecting a worker who is in proximity to the work machine and also of preventing itself from excessively alerting an operator thereof.

BRIEF DESCRIPTION OF THE DRAWINGS

FIG. 6 is a diagram illustrating an example of magnetic field information.

FIG. 7 is a diagram illustrating an example of tag information.

FIG. 8 is a diagram illustrating an example of detected tag information.

FIG. 9 is a diagram illustrating an example of worker position information.

FIG. 10 is a diagram illustrating an example of worker proximity notice information.

MODES FOR CARRYING OUT THE INVENTION

An embodiment of the present invention will hereinafter be described with reference to the drawings.

Figure 1:
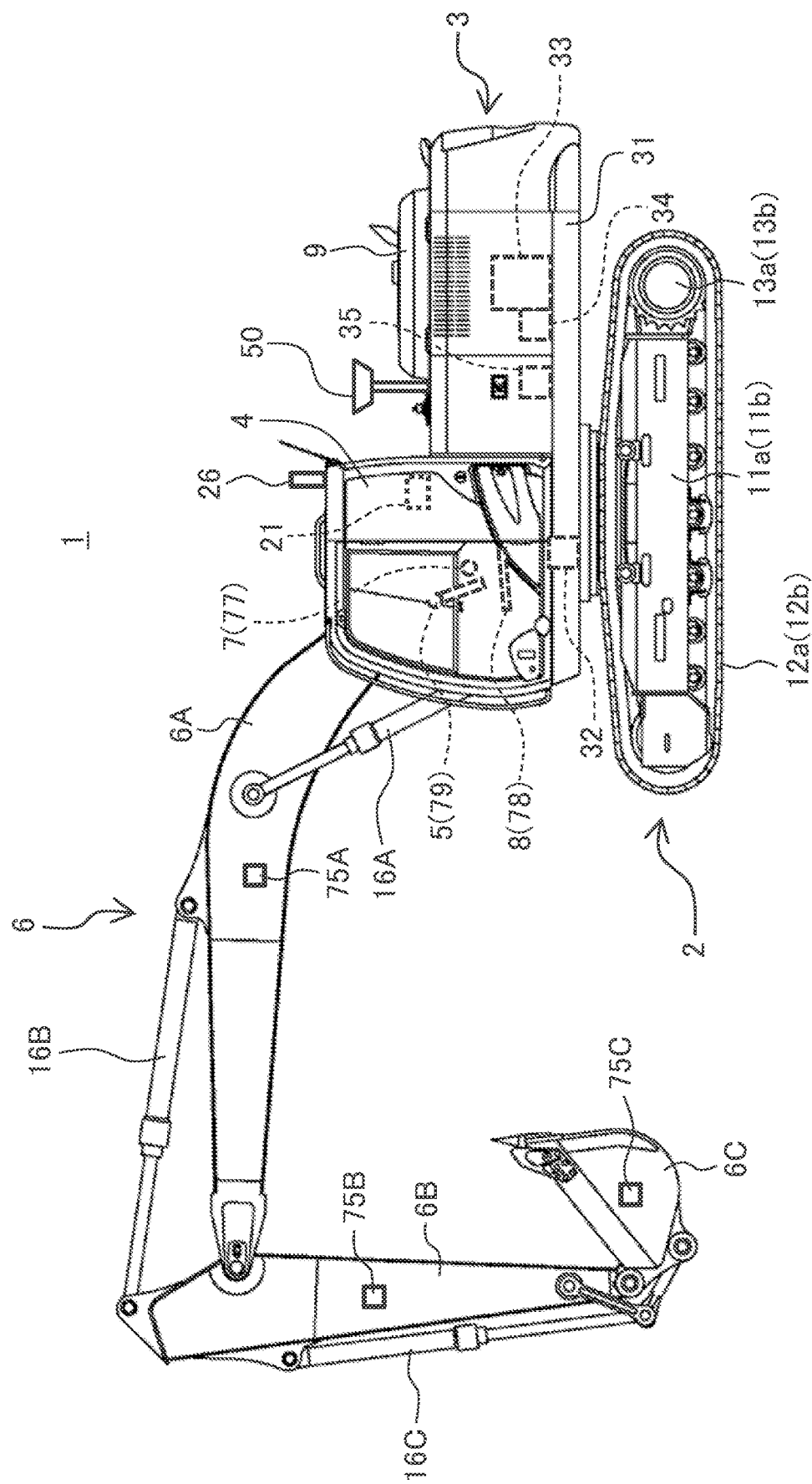
FIG. 1 is a side elevational view schematically illustrating an appearance of a hydraulic excavator as an example of a work machine according to an embodiment of the present invention.
Figure 2:
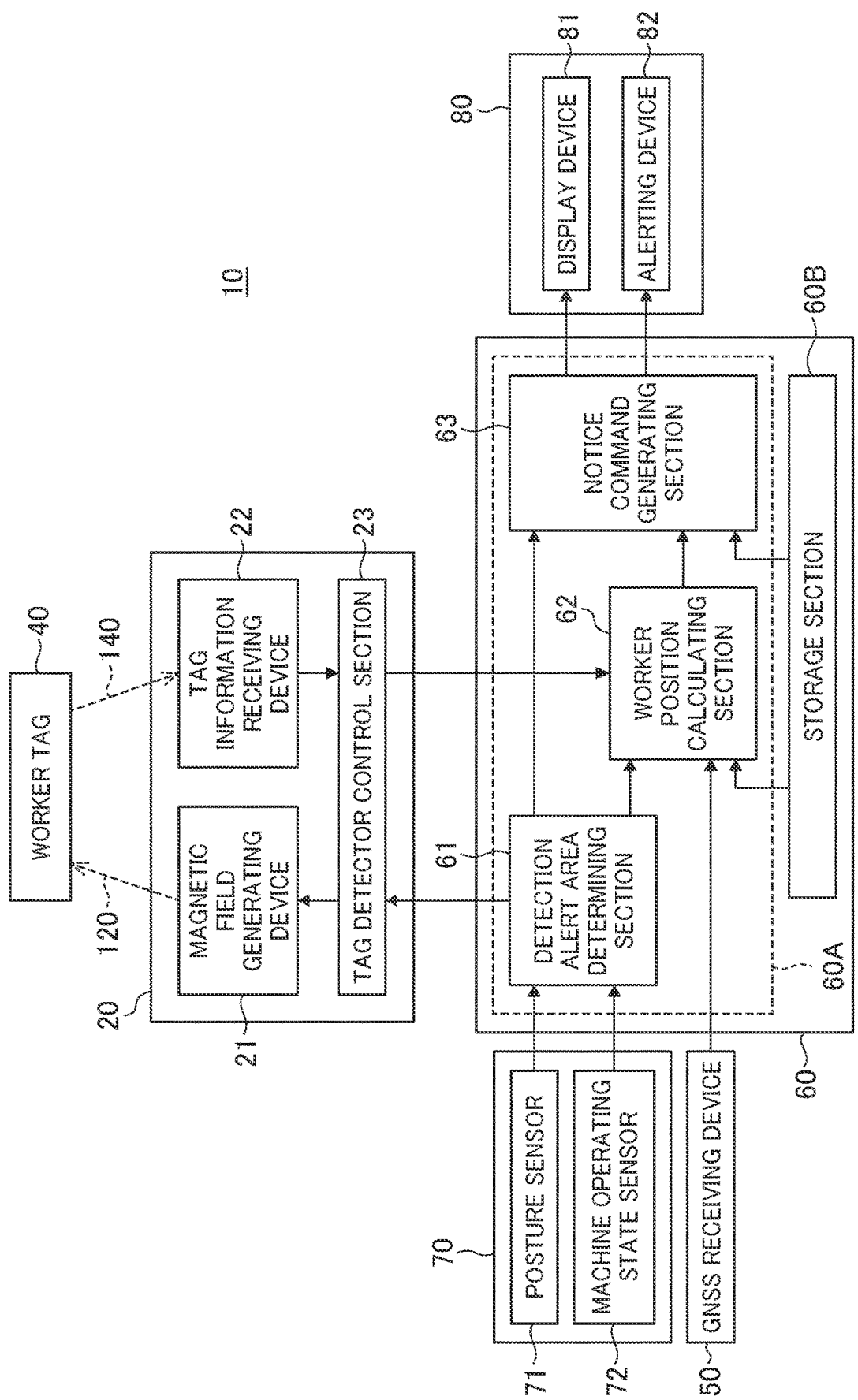
FIG. 2 is a diagram schematically illustrating a worker proximity notifying system incorporated in the work machine.
Figure 3:
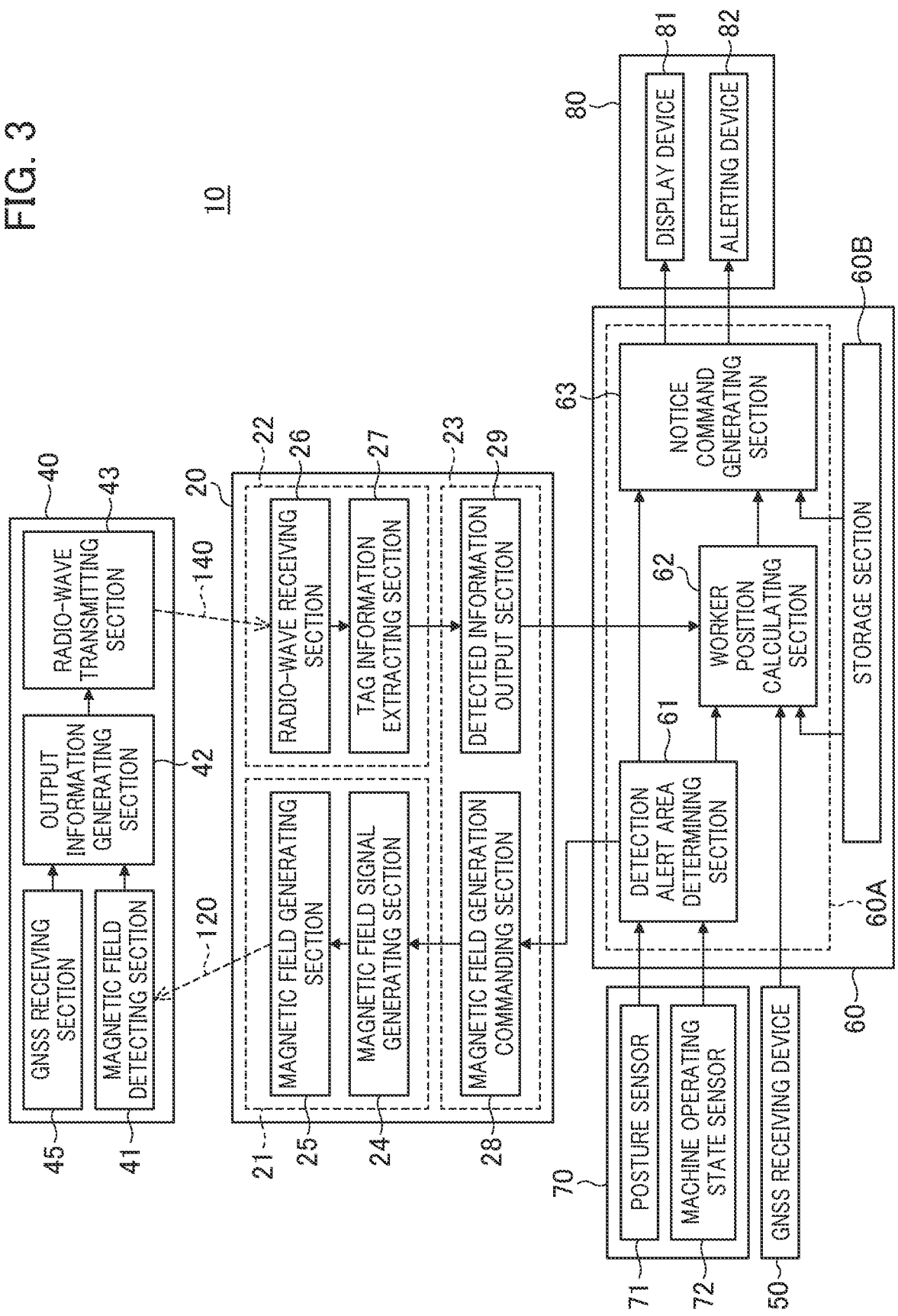
FIG. 3 is a diagram illustrating configurational details of a tag detector and a worker tag of the worker proximity notifying system.
Figure 4:
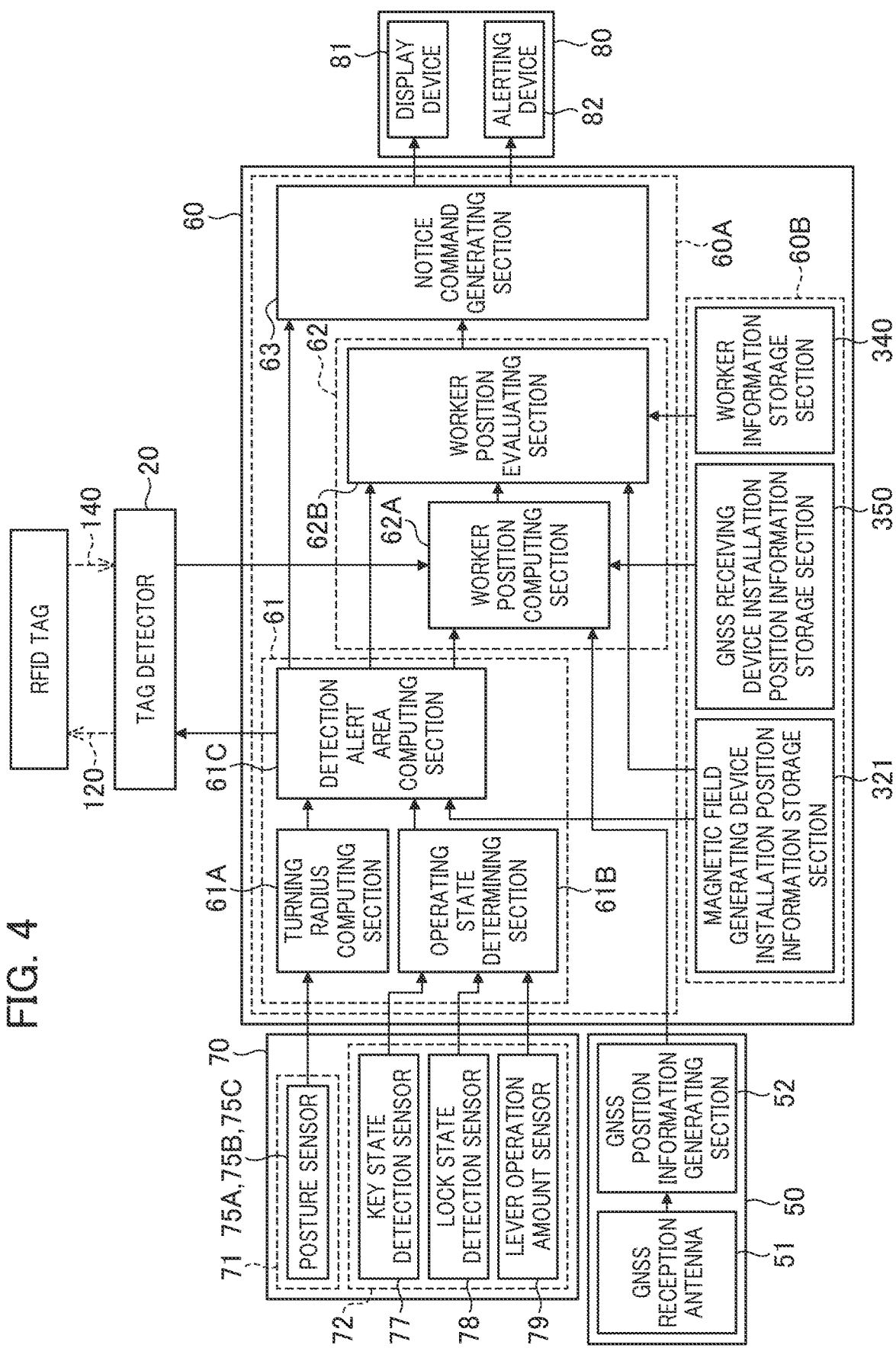
FIG. 4 is a diagram illustrating configurational details of a working state detecting device and a controller.

FIG. 1 is a side elevational view schematically illustrating an appearance of a hydraulic excavator as an example of a work machine according to an embodiment of the present invention. FIG. 2 is a diagram schematically illustrating a worker proximity notifying system incorporated in the work machine. FIG. 3 is a diagram illustrating configurational details of a tag detector and a worker tag of the worker proximity notifying system. FIG. 4 is a diagram illustrating configurational details of a working state detecting device and a controller.

As illustrated in FIG. 1, a hydraulic excavator 1 includes a multi-joint front work implement 6 (work implement) including a plurality of interconnected front members (a boom 6A, an arm 6B, and a bucket 6C) each angularly movable in vertical directions, and an upper swing structure 3 and a lower track structure 2 (propulsive device) that serve as a machine body. The upper swing structure 3 is swingably mounted on the lower track structure 2. The upper swing structure 3 includes a swing frame 31 as a base and various members disposed on the swing frame 31. The swing frame 31 is swingable with respect to the lower track structure 2. The boom 6A of the front work implement 6 has a proximal end supported for angular movement in vertical directions on a front portion of the upper swing structure 3. Furthermore, The arm 6B has an end supported for angular movement in vertical directions on an end (distal end) of the boom 6A that is different from the proximal end thereof. The bucket 6C is supported on the other end of the arm 6B for angular movement in vertical directions.

The lower track structure 2 includes a pair of crawlers 12a (12b) trained respectively around a pair of left and right crawler frames 11a (11b) and propulsive hydraulic motors 13a (13b), including speed reducer mechanisms, not depicted, for driving the crawlers 12a (12b), respectively. Note that, In FIG. 1, the components of the lower track structure 2 include pairs of left and right components where only those on one side are illustrated and denoted by reference characters whereas those on the other side are denoted by reference characters in parentheses, but not illustrated.

The front members 6A through 6C are angularly moved when driven by a boom cylinder 16A, an arm cylinder 16B, and a bucket cylinder 16C as hydraulic actuators, whereas the lower track structure 2 travels when driven by the left and right propulsive hydraulic motors 13a (13b). Furthermore, the upper swing structure 3 is swung with respect to the lower track structure 2 when driven by a swing hydraulic motor 32 as a hydraulic actuator.

The front members 6A through 6C of the front work implement 6 have respective posture sensors 75A through 75C for acquiring posture information thereof. The posture sensors 75A through 75C may be, for example, inertial measurement units (IMUs) for measuring angular velocities and accelerations of the front members on which they are installed. The posture sensors 75A through 75C output measured values of angular velocities and accelerations in an IMU coordinate system established for the posture sensors 75A through 75C, as posture information. The postures of the front members 6A through 6C can recognized by using these measured values and information about the way in which the posture sensors 75A through 75C are installed (the relative positional relationship between the posture sensors 75A through 75C and the front members 6A through 6C).

The swing frame 31 of the upper swing structure 3 supports thereon a prime mover 33 such as an engine or the like, a hydraulic pump 34 driven by the prime mover 33, and a control valve 35 for controlling the directions and flow rates of working oil discharged from the hydraulic pump 34 and supplied to the hydraulic actuators including the boom cylinder 16A, the arm cylinder 16B, the bucket cylinder 16C, the swing hydraulic motor 32, and the left and right propulsive hydraulic motors 13a and 13b. The prime mover 33, the hydraulic pump 34, and the control valve 35 make up a hydraulic circuit system. The upper swing structure 3 supports thereon an operation controller 9 for activating and inactivating the hydraulic excavator 1 and controlling overall operation thereof. The operation controller 9 controls operation of the hydraulic actuators 16A through 16C, 32, 13a, and 13b by controlling the control valve 35 on the basis of operating signals output from an operation lever device 5 which correspond to respective hydraulic actuators to operate them.

Furthermore, A cabin 4 where the operator is seated to operate the hydraulic excavator 1 is disposed on a front portion of the swing frame 31 of the upper swing structure 3 laterally (on the left side according to the present embodiment) of an area where the proximal end of the boom 6A of the front work implement 6 is supported. The cabin 4 houses therein an engine key switch 7, the operation lever device 5, a lock lever 8, and a notification device 80 including a display device 81 and an alerting device 82.

The engine key switch 7 selectively activates and inactivates the hydraulic excavator 1. When the engine key switch 7 is shifted to a position "OFF," the hydraulic excavator 1 is inactivated (the engine 33 is shut down). When the engine key switch 7 is shifted to a position "ON," the hydraulic excavator 1 is activated (the engine 33 and various systems are turned on). The engine key switch 7 is combined with a key state detection sensor 77, whose reference numerals are enclosed in parentheses in FIG. 1, that detects whether the engine key switch 7 is shifted to the position "ON" or the position "OFF."

The operation lever device 5 includes operation levers for driving the front work implement 6, a propulsion lever for propelling the lower track structure 2, and an operation lever for turning the upper swing structure 3. Specifically, the operation lever device 5 includes a plurality of operation levers, not depicted, corresponding respectively to the hydraulic actuators 16A through 16C, 32, 13a, and 13b to operate them. The operation lever device 5 is combined with lever operation amount sensors 79, whose reference numeral is enclosed in parentheses in FIG. 1, that detect the quantities of operation of the operation levers corresponding respectively to the hydraulic actuators 16A through 16C, 32, 13a, and 13b to operate them.

The lock lever 8 selectively interrupts and releases the operating signals output from the operation lever device 5. When the lock lever 8 is shifted to a position "LOCK," it interrupts the operating signals output from the operation lever device 5, making them ineffective, so that the hydraulic actuators 16A through 16C, 32, 13a, and 13b are not actuatable. Furthermore, when the lock lever 8 is shifted to a position "UNLOCK," it releases the interruption of the operating signals output from the operation lever device 5, making them effective, so that the hydraulic actuators 16A through 16C, 32, 13a, and 13b are actuatable. The lock lever 8 is combined with a locked state detection sensor 78, whose reference numerals are enclosed in parentheses in FIG. 1, that detects whether the lock lever 8 is shifted to the position "LOCK" or the position "UNLOCK."

The posture sensors 75A through 75C make up a posture sensor 71 that detects information about the postures (posture information) of the front members 6A through 6C of the front work implement 6. Furthermore, the key state detection sensor 77 combined with the engine key switch 7, the locked state detection sensor 78 combined with the lock lever 8, and the lever operation amount sensors 79 combined with the operation lever device 5 make up a machine operation state sensor 72 that detects a working state of the hydraulic excavator 1. In addition, the posture sensor 71 and the machine operation state sensor 72 make up an operation state detecting device 70 that detects a working state of the hydraulic excavator 1 (see FIG. 4, etc.).

Furthermore, a GNSS receiving device 50, as part of a GNSS (Global Navigation Satellite System), for outputting positional information about the three-dimensional position of the hydraulic excavator 1 on the basis of radio waves received from positioning satellites is disposed on an upper portion of the upper swing structure 3. The GNSS receiving device 50 includes a GNSS reception antenna 51 for receiving radio waves from a plurality of positioning satellites and a GNSS position information generating section 52 for demodulating the radio waves received from the positioning satellites, extracting positioning signals therefrom, and calculating the three-dimensional position of the hydraulic excavator 1 on the basis of the positioning signals from the positioning satellites. The GNSS position information generating section 52 outputs received GNSS data including the calculated three-dimensional position values (positional information) of the hydraulic excavator 1, and GNSS positioning quality information that represents a benchmark for the accuracy and reliability of the calculated three-dimensional position values. The GNSS positioning quality information refers, for example, to the number and layout of the satellites that are used in calculating the positional information, positioning states including Fix, Float, independent positioning, etc., estimated calculated position error values in latitude and longitude directions, etc. In case the GNSS receiving device 50 is unable to receive signals required to calculate the calculated three-dimensional position values (positional information), the GNSS receiving device 50 outputs "IMPOSSIBLE TO POSITION" as a positioning state in the GNSS positioning quality information, and also outputs "N/A (IMPOSSIBLE TO CALCULATE)" as the calculated three-dimensional position values (positional information).

A worker proximity notification system 10 according to the present embodiment is incorporated in the hydraulic excavator 1 described above, and detects a worker according to operating principles described below. In the worker proximity notification system 10 according to the present embodiment, a worker as a detection target, which includes the operator of the hydraulic excavator 1, carries a worker tag 40. The worker tag 40 has a function to acquire calculated three-dimensional position values (positional information) based on the GNSS (Global Navigation Satellite System), and a function to detect an induced magnetic field (a magnetic field signal 120 to be described later) generated by a magnetic field generating device 21 installed on the hydraulic excavator 1. When the worker tag 40 detects an induced magnetic field generated by the magnetic field generating device 21, the worker tag 40 sends a radio-wave signal 140 representing a tag ID that identifies the worker tag 40 itself, a magnetic field ID (a received value) of the induced magnetic field, and calculated three-dimensional position values (positional information) to a tag detector 20. For example, in case the tag detector 20 receives the radio-wave signal 140, the tag detector 20 recognizes that the worker tag 40 is present in an area where the worker tag 40 can receive the magnetic field signal 120. In case the tag detector 20 does not receive the radio-wave signal 140, the tag detector 20 recognizes that the worker tag 40 is present outside of the area where the worker tag 40 can receive the magnetic field signal 120. The hydraulic excavator 1 also has a function to acquire calculated three-dimensional position values (positional information) based on the GNSS, and can calculate a detailed positional relationship between the hydraulic excavator 1 and the worker tag 40 using the positional information from the worker tag 40.

<Worker Proximity Notification System 10>

As illustrated in FIGS. 2 through 4, the worker proximity notification system 10 according to the present embodiment generally includes the worker tag 40 carried by a worker who possibly works around the hydraulic excavator 1 that is a work machine, the tag detector 20 that detects the worker tag 40 around the hydraulic excavator 1, the operation state detecting device 70 that detects an operating state of the hydraulic excavator 1, the GNSS receiving device 50 that outputs the calculated three-dimensional position values (positional information) of the hydraulic excavator 1 on the basis of radio waves received from the positioning satellites, a controller 60 that controls the tag detector 20, determines whether the worker tag 40 is present in a predetermined range or not and the position where the worker tag 40 is present on the basis of information obtained by the tag detector 20, the operation state detecting device 70, and the GNSS receiving device 50, and generates a notification command for notifying the operator of the determined result, and the notification device 80, disposed in the cabin 4 of the hydraulic excavator 1, that notifies the operator of the determined result from the controller 60 on the basis of the notification command from the controller 60.

<Notification Device 80>

The notification device 80 is a device for notifying the operator of the work machine 1 of the presence of a worker (stated otherwise, the presence of a worker tag 40) around the hydraulic excavator 1. The notification device 80 includes the display device 81 and the alerting device 82. Note that since any worker necessarily carries a worker tags 40, a worker whose presence and position are to be detected and a worker tag 40 are synonymous with each other.

The display device 81 includes a liquid crystal panel or the like, for example, and is disposed in a position where it can easily be seen by the operator in the cabin 4 of the hydraulic excavator 1 and where it does not obstruct the operator's field of vision outside of the cabin 4. The display device 81 is used to notify the operator of the hydraulic excavator 1 of the presence of a worker through visual information. Based on a display command (a notification command) from the controller 60, the display device 81 displays an area where a worker is present and also displays a notification indicating a worker in the proximity of the hydraulic excavator 1.

The alerting device 82 is a device capable of producing sound, speech, or the like, and is disposed in the cabin 4 of the hydraulic excavator 1. The alerting device 82 is used to indicate a worker in the proximity of the hydraulic excavator 1 through audio information. Based on an alert command (a notification command) from the controller 60, the alerting device 82 generates an alert sound indicating a worker in the proximity of the hydraulic excavator 1.

<Worker Tag 40>

Worker tags 40 are carried by the operator of the hydraulic excavator 1 and workers who work around the hydraulic excavator 1. The worker tags 40 are carried by all workers who work at a work site where the hydraulic excavator 1 operates. Therefore, there are as many worker tags 40 as the number of workers present in the work site. When a worker tag 40 receives the magnetic field signal 120 generated by the magnetic field generating device 21 of the tag detector 20, the worker tag 40 sends a radio-wave signal 140 representing the magnetic field ID of the magnetic field signal 120 (an inherent ID set in the magnetic field generating device 21 (see FIG. 6)) and the tag ID that identifies the worker tag 40 itself that has received the magnetic field signal 120.

The worker tag 40 has a magnetic field detecting section 41 such as an antenna (e.g., a coil or the like) for detecting the magnetic field signal 120 generated by the tag detector 20, a GNSS receiving section 45 for outputting calculated three-dimensional position values (positional information) of the worker (the worker tag 40) based on the radio waves received from positioning satellites, a radio-wave transmitting section 43 such as an antenna (e.g., a coil or the like) for generating a radio-wave signal 140 with a drive signal, and an output information generating section 42 for generating a drive signal for the radio-wave transmitting section 43 based on the magnetic field signal 120 detected by the magnetic field detecting section 41.

As with the GNSS receiving device 50, the GNSS receiving section 45 includes, though not depicted for the sake of brevity, a GNSS reception antenna for receiving radio waves from the positioning satellites and a GNSS position information generating section for demodulating the radio waves received from the positioning satellites, extracting positioning signals therefrom, and calculating the three-dimensional position of the worker tag 40 on the basis of the positioning signals from the positioning satellites. The GNSS position information generating section of the GNSS receiving section 45 outputs received GNSS data including the calculated three-dimensional position values (positional information) of the worker tag 40, and GNSS positioning quality information that represents a benchmark for the accuracy and reliability of the calculated three-dimensional position values (positional information). The GNSS positioning quality information refers, for example, to the number and layout of the satellites that are used in calculating the positional information, positioning states including Fix, Float, independent positioning, etc., estimated calculated position error values in latitude and longitude directions, etc. In case the GNSS receiving section 45 is unable to receive signals required to calculate the calculated three-dimensional position values (positional information), the GNSS receiving section 45 outputs "IMPOSSIBLE TO POSITION" as a positioning state in the GNSS positioning quality information, and also outputs "N/A (IMPOSSIBLE TO CALCULATE)" as the calculated three-dimensional position values (positional information).

In case the magnetic field detecting section 41 detects a magnetic field signal 120, the output information generating section 42 demodulates the magnetic field signal 120 and extracts a magnetic field ID included therein. Then, the output information generating section 42 generates information (hereinafter referred to as "tag information," see FIG. 7) representing a tag ID that is an inherent ID that identifies the worker tag 40 itself, the extracted magnetic field ID (a received magnetic field ID value) and the received GNSS data, modulates the generated information, and outputs the modulated information as a drive signal to the radio-wave transmitting section 43. The worker tag 40 now sends a radio-wave signal 140 having a predetermined frequency and intensity that represents tag information (the tag ID, the received magnetic field ID value, and the received GNSS data (the GNSS quality information and the calculated three-dimensional position values)).

The worker tag 40 is of a semi-active type, for example. The worker tag 40 stands by in a state (a standby state) in which it does not send a radio-wave signal until it receives a magnetic field signal 120. When the worker tag 40 receives a magnetic field signal 120 from the tag detector 20, the worker tag 40 performs various processes in response to the received magnetic field signal 120 as a trigger. When the worker tag 40 finishes sending the necessary radio-wave signal, the worker tag 40 is back in the standby state until it receives a new magnetic field signal. In other words, the worker tag 40 sends a radio-wave signal 140 upon the reception of a magnetic field signal 120.

<Tag Detector 20>

The tag detector 20 has the magnetic field generating device 21 that generates a magnetic field signal 120 including a magnetic field ID that identifies a source for generating the magnetic field, a tag information receiving device 22 that receives a radio-wave signal 140 sent from the worker tag 40 upon the reception of the magnetic field signal 120, and a tag detecting device control section 23 that controls the generation of the magnetic field signal 120 from the magnetic field generating device 21 on the basis of a control signal from the controller 60 and that acquires information represented by the radio-wave signal 140 received by the tag information receiving device 22 and outputs the acquired information to the controller 60.

The magnetic field generating device 21 has a magnetic field generating section 25 such as an antenna (e.g., a coil or the like) for generating an induced magnetic field as a magnetic field signal 120 based on a drive signal, and a magnetic field signal generating section 24 for generating a drive signal based on a magnetic field generating command from the tag detecting device control section 23 and outputting the generated drive signal to the magnetic field generating section 25.

The magnetic field signal generating section 24 generates a signal based on information (hereinafter referred to as "magnetic field information," see FIG. 6) representing a magnetic field ID corresponding to the magnetic field generating device 21 (i.e., an ID inherent in the magnetic field generating device 21) modifies the generated signal, and outputs the modulated signal as a drive signal to the magnetic field generating section 25. The magnetic field generating section 25 now generates a magnetic field signal 120 that is a modulated signal including a magnetic field ID.

Figure 5:
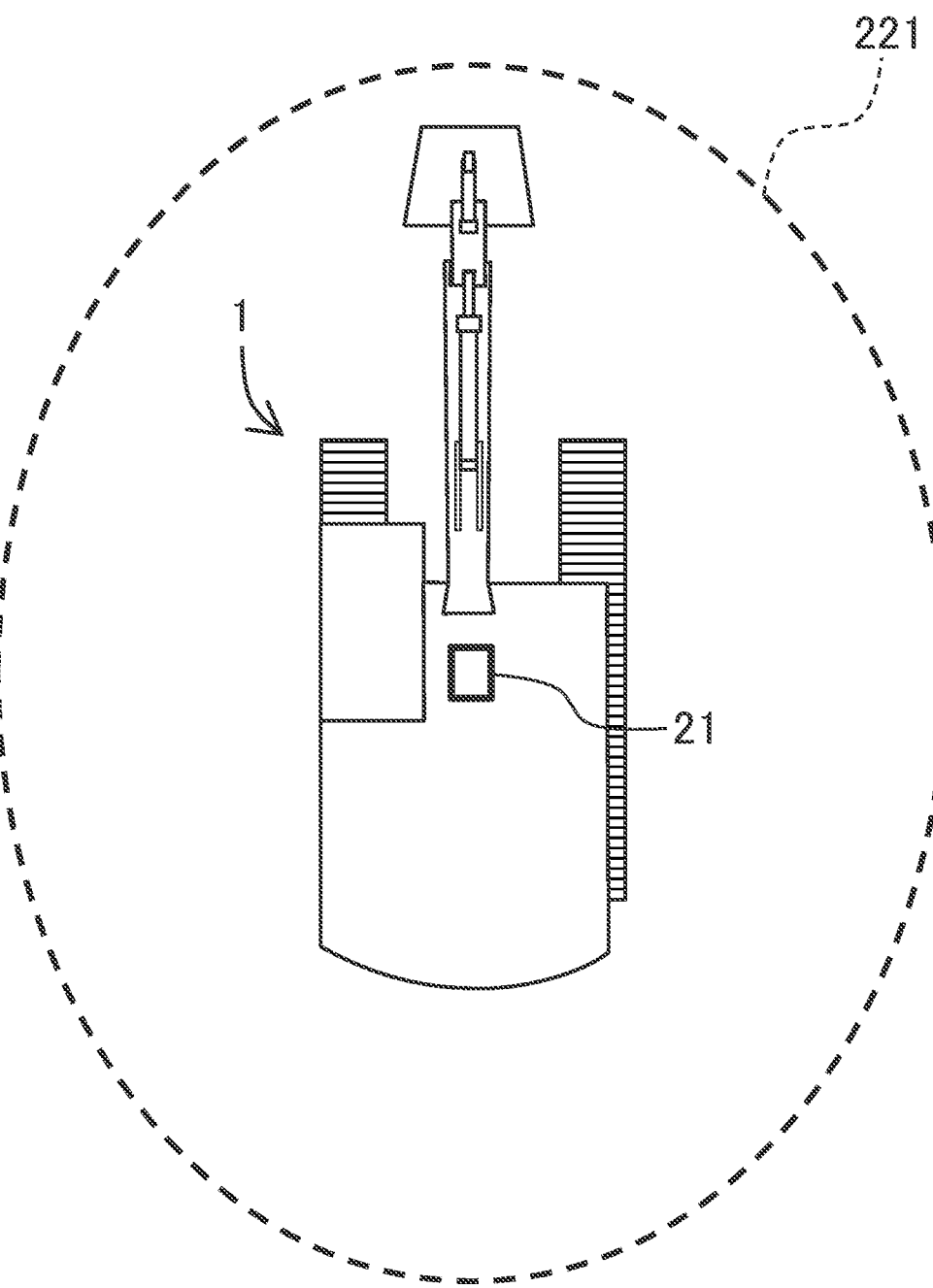
FIG. 5 is a plan view illustrating an example of the position of a magnetic field generating device on the hydraulic excavator.

FIG. 5 is a plan view illustrating an example of the position of the magnetic field generating device on the hydraulic excavator.

As illustrated in FIG. 5, the magnetic field generating device 21 is installed on the hydraulic excavator 1, and disposed over the center of swinging motion of the upper swing structure 3, for example. In case the magnetic field generating device 21 generates a magnetic field signal 120 having a constant intensity, for example, the range in which the magnetic field signal 120 generated by the magnetic field generating device 21 can be received with the magnetic field detection sensitivity of the worker tag 40 (a magnetic field detectability area 221) is a certain range around the magnetic field generating device 21. Since the worker tag 40 outputs a radio-wave signal 140 to the tag information receiving device 22 when it receives the magnetic field signal 120 from the magnetic field generating device 21, the magnetic field detectability area 221 is an area where the worker tag 40 can be detected. According to the present embodiment, by way of illustrative example, the magnetic field generating device 21 is disposed such that the magnetic field detectability area 221 is formed in an elliptical shape by the magnetic field signal 120 generated by the magnetic field generating device 21, with the elliptical shape having a major axis extending in the longitudinal directions of the upper swing structure 3. For example, by setting the magnetic field intensity of the magnetic field signal 120 generated by the magnetic field generating device 21 such that the entire hydraulic excavator 1 including the front work implement 6 in a predetermined posture is positioned within the magnetic field detectability area 221, a worker (a worker tag 40) positioned within a prescribed distance fully around the hydraulic excavator 1 can be detected. For the sake of brevity, FIG. 5 illustrates a cross section of the magnetic field detectability area 221 in a horizontal plane at a height where the presence of a worker tag 40 is supposed (e.g., a supposed height value in the vicinity of the chest or waist of a worker). The magnetic field detectability area 221 formed by the magnetic field signal 120 generated by the magnetic field generating device 21 may not necessarily be elliptical in shape. Rather, the magnetic field generating device 21 may be arranged to form a magnetic field detectability area 221 shaped as a true circle.

The tag information receiving device 22 has a radio-wave receiving section 26 such as an antenna, e.g., a coil or the like, for receiving the radio-wave signal 140 sent from the worker tag 40, and a tag information extracting section 27 for demodulating the radio-wave signal 140 received by the radio-wave receiving section 26, extracting tag information represented by the radio-wave signal 140, and outputting the extracted tag information to the tag detecting device control section 23.

The tag detecting device control section 23 has a magnetic field generation commanding section 28 for outputting a next generation command to the magnetic field signal generating section 24 of the magnetic field generating device 21 on the basis of a detection command output from the controller 60 and representing information of a range (hereinafter referred to as "detection target area") in which the position where a worker tag 40 is present around the hydraulic excavator 1 is a detection target, and a detected information output section 29 for processing the tag information output from the tag information extracting section 27 of the tag information receiving device 22 and outputting the processed tag information to the controller 60.

The magnetic field generation commanding section 28 outputs a magnetic field generation command including a magnetic field intensity command value that makes the magnetic field detectability area 221 into the detection target area on the basis of the information of the detection target area included in the detection command from the controller 60.

The detected information output section 29 generates information (hereinafter referred to as "detected tag information, see FIG. 8) representing tag information (the tag ID, the received magnetic field ID value, and the received GNSS data (the GNSS quality information and the calculated three-dimensional position values)), collected for each tag, from the tag information receiving device 22, and outputs the generated detected tag information to the controller 60. The detected information output section 29 collects received GNSS data (the GNSS quality information and the calculated three-dimensional position values) for each worker tag 40 from the received tag information, generates a detected tag list of detected tags each representing a detected tag ID and received GNSS data, adds its own magnetic field ID to the detected tag list, thereby generating detected tag information.

Other work machines than the hydraulic excavator 1 may be present in the work site and may have detecting function parts for generating induced magnetic fields equivalent to the magnetic field signal 120 and acquiring returning radio waves (radio-wave signals) from worker tags 40. Therefore, in case other work machines are present in the vicinity of the hydraulic excavator 1, the tag information receiving device 22 may possibly receive returning radio waves sent from worker tags 40 to the detecting function parts of the other work machines. At the time of generating detected tag information, in case the detected information output section 29 according to the present embodiment recognizes that the received radio wave is a radio wave that has returned to itself on account of the received magnetic field ID value included in the tag information, or stated otherwise, only in case the received radio-wave signal 140 is a radio wave that has returned from a worker tag 40 in response to the magnetic field signal 120 from the magnetic field generating device 21 disposed on the hydraulic excavator 1, the detected information output section 29 performs a process of generating detected tag information (a detected tag information generating process). Furthermore, depending on the period of the detected tag information output from the tag detector 20 to the controller 60 and the period of the radio-wave signal 140 sent from the worker tag 40, the tag detector 20 may receive a plurality of radio-wave signals 140 from one worker tag 40 within the period of a detected tag signal output to the controller 60. In case the detected information output section 29 according to the present embodiment has received a plurality of radio-wave signals 140 from one worker tag 40, the detected information output section 29 generates detected tag information in which the received tag information with the best GNSS positioning quality information, among all the received tag information, is used as the received GNSS data of the worker tag 40.

Figure 11:
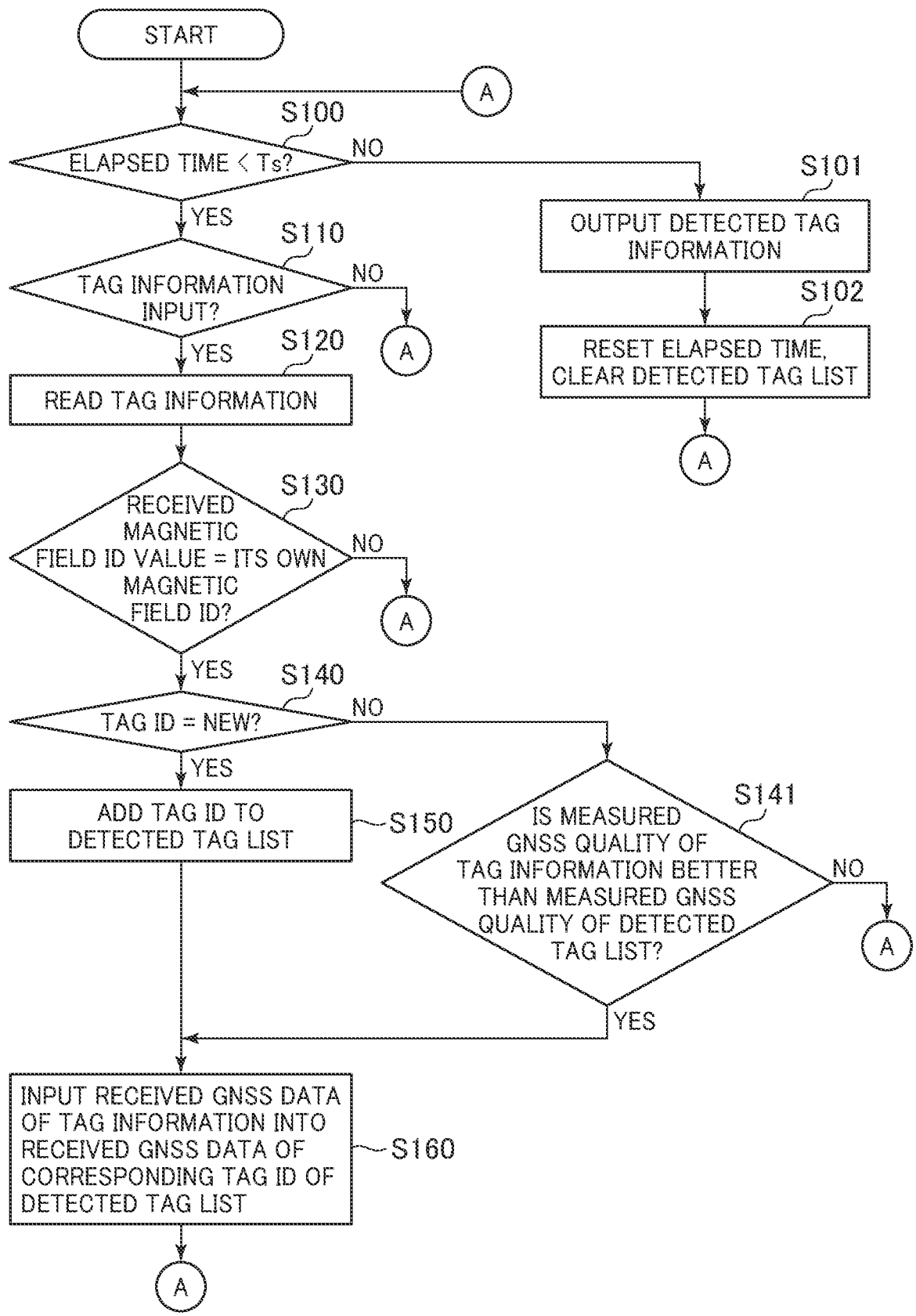
FIG. 11 is a flowchart illustrating processing details of a detected tag information generating process of a detected information output section.

FIG. 11 is a flowchart illustrating processing details of the detected tag information generating process of the detected information output section.

As illustrated in FIG. 11, the detected information output section 29 determines whether a predetermined time Ts has elapsed from the preceding outputting of detected tag information to the controller 60 or not (step S100). If the determined result is NO in step S100, i.e., if the time Ts has elapsed from the preceding outputting of detected tag information, then the detected information output section 29 outputs detected tag information being generated to the controller 60 (step S101), and resets the elapsed time and clears a detected tag list being generated (S102), after which control returns to the processing of step S100.

Furthermore, if the determined result is YES in step S100, i.e., if the time Ts has not elapsed, then the detected information output section 29 determines whether tag information has been input or not (S110). If the determined result is NO in step S110, then control returns to the processing of step S100.

Furthermore, if the determined result is YES in step S110, i.e., if the tag information extracted by the tag information extracting section 27 from the radio-wave signal 140 received by the radio-wave receiving section 26 of the tag information receiving device 22 is input, the detected information output section 29 reads the tag information (step S120), and determines whether the received magnetic field ID value is its own magnetic field ID or not, i.e., if the radio-wave signal 140 received by the radio-wave receiving section 26 is a radio-wave that has returned from a worker tag 40 in response to the magnetic field signal 120 from the magnetic field generating device 21 disposed on the hydraulic excavator 1 or not (step S130). If determined result is NO in step S130, then control returns to the processing of step S100.

Furthermore, if the determined result is YES in step S130, i.e., if the received radio wave is a radio wave that has returned to itself, then the detected information output section 29 determines whether the tag ID included in the input tag information is new or not, i.e., if the tag ID included in the input tag information is included in the detected tag list of the detected tag information being generated or not (step S140). If the determined result is YES in step S140, then the detected information output section 29 adds the tag ID to the detected tag list (step S150), and inputs the received GNSS data included in the tag information as the received GNSS data of the corresponding tag ID in the detected tag list (step S160), after which control returns to the processing of step S100.

Furthermore, if the determined result is NO in step S140, i.e., if the tag ID included in the input tag information is already included in the detected tag list of the detected tag information being generated, then the detected information output section 29 determines whether the GNSS positioning quality information included in the received GNSS data of the input tag information is better than the GNSS positioning quality information included in the received GNSS data of the detected tag list being generated or not (step S141). If the determined result is NO in step S141, i.e., if the GNSS positioning quality information of the corresponding tag ID in the detected tag list being generated is better, then control returns to the processing of step S100.

Furthermore, if the determined result is YES in step S141, i.e., if the GNSS positioning quality information included in the tag information is better, then the detected information output section 29 inputs the received GNSS data included in the tag information as the received GNSS data of the corresponding tag ID in the detected tag list (step S160), after which control returns to the processing of step S100.

<Controller 60>

The controller 60 controls operation of the worker proximity notification system 10 in its entirety. The controller 60 has a processor 60A that generates a detection command based on the detected result from the operation state detecting device 70 and the received GNSS data from the GNSS receiving device 50 and outputs the generated detection command to the tag detector 20 for controlling the tag detector 20, and a storage section 60B that stores various pieces of information used in processing sequences of the processor 60A. Note that the controller 60 includes a CPU (central processing unit), a storage section such as a ROM (Read Only Memory), a RAM (Random Access Memory) and a flash memory, microcomputer including them, and a peripheral circuit or the like, not depicted, and operates according to programs stored in the ROM, for example.

The storage section 60B holds information necessary for processing operations of the processor 60A and outputs the held information when necessary. The storage section 60B has a magnetic field generating device installation position information storage section 321 for storing information (installation position information) about the position where the magnetic field generating device 21 is installed on the hydraulic excavator 1, a GNSS receiving device installation position information storage section 350 for storing information about the position where the GNSS receiving device 50 is installed on the hydraulic excavator 1, and a worker information storage section 340 for storing worker information representing a worker (including the operator) carrying the worker tag 40, its attribute, and the tag ID of the worker tag 40 that are associated with each other.

The magnetic field generating device installation position information storage section 321 stores information about the position where the magnetic field generating device 21 is installed on the hydraulic excavator 1, i.e., information (magnetic field generating device installation position information) about the position and direction of the magnetic field generating device 21 in a coordinate system or the like that is fixedly established relatively to the upper swing structure 3. In other words, the magnetic field generating device installation position information is information representing which position the magnetic field generating device 21 is installed in on the hydraulic excavator 1 and which direction the magnetic field generating device 21 is generating an induced magnetic field in. Note that the magnetic field generating device installation position information may include information about the intensity of a magnetic field that the magnetic field generating device 21 can achieve and information representing an association between the magnetic field intensity and the magnetic field detectability area.

The GNSS receiving device installation position information storage section 350 holds information representing which position the GNSS receiving device 50 is installed in on the hydraulic excavator 1. The GNSS receiving device installation position information storage section 350 is used to convert calculated three-dimensional position values (positional information) according to the global standards that is calculated on the basis of radio-wave signals from the positioning satellites into positional information on the hydraulic excavator 1.

The worker information storage section 340 holds a list of worker information for identifying workers, where tag IDs inherent in worker tags 40 and worker attributes are associated with each other. The worker attributes include information for distinguishing workers including the operator of the hydraulic excavator 1 (own machine), assistant workers, peripheral workers, the operators of other work machines (other machines), the supervisor, etc., for example. The worker attributes may include information about the number of years of experience of workers, etc. Indexes representing the above attributes that are combined together may be included as attribute information in worker information.

By using such worker information, it is possible to recognize what kind of work a worker detected by the tag detector 20 performs, so that a different process for indicating proximity may be used for each worker to give proximity notification at more appropriate timing. A plurality of workers are assumed to be present at the site where the hydraulic excavator 1 operates. In case a worker is detected as being present in the vicinity of the front work implement 6, for example, if the detected worker is a worker (assistant worker) assisting in the operation of the hydraulic excavator 1 in the vicinity of the front work implement 6 at all times, then the alerting device 82 does not issue a proximity notification, but only the display device 81 displays a notification. Furthermore, if the detected worker is the operator of another hydraulic excavator 1, then the display device 81 displays a notification and, in addition, the alerting device 82 issues a proximity notification. In case a worker as an assistant worker is detected as being present sideways of the hydraulic excavator 1, the display device 81 displays a notification and, in addition, the alerting device 82 issues a proximity notification. By thus using a different process for indicating proximity for each worker, excessive proximity notifications are restrained from occurring, thereby preventing the operator from being annoyed and troubled and from suffering a reduction in working efficiency.

The processor 60A includes a detection alert area determining section 61 for determining a detection target area (e.g., a detection target area 230 in FIG. 15 to be described later) where the position of a worker tag 40 is a detection target, and a proximity notification target area (e.g., proximity notification target areas 280A and 280B in FIG. 15 to be described later) where the proximity of a worker tag 40 is a proximity notification target in the detection target area, on the basis of the detected result from the operation state detecting device 70, a worker position calculating section 62 for calculating the position of a worker tag 40 based on the positional information of the hydraulic excavator 1, the positional information of the worker tag 40, the detected tag information acquired by the detected information output section 29 of the tag detecting device control section 23, and the detection target area determined by the detection alert area determining section 61, and a notification command generating section 63 for generating a notification command and outputting the generated notification command to the notification device 80 to notify the operator of the hydraulic excavator 1 of the detection of the worker tag 40 in case the worker tag 40 is detected in the proximity notification target area.

The detection alert area determining section 61 has a turning radius computing section 61A for calculating a turning radius representing the distance from the center of swinging motion of the upper swing structure 3 of the hydraulic excavator 1 with respect to the lower track structure 2 to a farthest end of the front work implement 6 on the basis of the detected signal from the posture sensor 71 of the operation state detecting device 70, an operation state determining section 61B for determining an operation state of the hydraulic excavator 1 on the basis of the detected result from the machine operation state sensor 72 of the operating state detecting device 70, and a detection alert area computing section 61C for determining a detection target area and a proximity notification target area using the calculated result from the turning radius computing section 61A and the determined result from the operating state determiner 61B.

The turning radius computing section 61A calculates the distance from the center of swinging motion of the hydraulic excavator 1 to the farthest end of the front work implement 6 as the turning radius on the basis of the detected signals from the posture sensor 71 (the posture sensors 75A through 75C). Depending on the posture of the front work implement 6, the distance from the center of swinging motion to the end of the arm 6B closer to the boom 6A may be smaller than the distance from the center of swinging motion to the distal end of the bucket 6C. For this reason, the turning radius computing section 61A regards the location farthest from the center of swinging motion as the end of the front work implement 6 (the front work implement end) depending on the postures of the boom 6A, the boom 6B, and the bucket 6C. Furthermore, the turning radius computing section 61A regards the distance from the center of swinging motion to the front work implement end and calculates the distance from dimensional information of various parts of the hydraulic excavator 1 and the input signals from the posture sensor 71 (the posture sensors 75A through 75C) by way of a linked operation. According to the present embodiment, the location farthest from the center of swinging motion is handled as the front work implement end. In case the front work implement 6 is present in a position sufficiently higher than the heights of workers, the workers will never enter a spatial area where the front work implement 6 moves upon swinging motion of the upper swing structure 3. Therefore, a height at which workers may possibly enter the spatial area where the front work implement 6 moves upon swinging motion of the upper swing structure 3 may be prescribed, and the location of the front work implement 6 that is farthest from the center of swinging motion at or smaller than the prescribed height may be handled as the front work implement end. Furthermore, in case the calculated turning radius is smaller than the distance from the center of swinging motion to the rear end of the upper swing structure 3, the distance from the center of swinging motion to the rear end of the upper swing structure 3 may be output as the turning radius.

The operation state determining section 61B performs a process of determining an operation state of the hydraulic excavator 1 (an operation state determining process) using the input signals from the machine operation state sensor 72 (the key state detection sensor 77, the locked state detection sensor 78, and the lever operation amount sensors 79). The operating state determiner 61B determines an engine starting state with the input signal from the key state detection sensor 77, a locked state of the lock lever 8 with the input signal from the locked state detection sensor 78, and operating types with the input signal from the lever operation amount sensors 79. Providing the lock lever 8 is in the locked state, the hydraulic excavator 1 will not operate no matter how the operation lever device 5 is manipulated even though the engine has been started. According to the present embodiment, the hydraulic excavator 1 has four types of operation state defined as "engine shutdown state," "operation locked state," "operation standby state," and "working state." The "working state" of the hydraulic excavator 1 includes four types defined as "front working state," "swinging state," "combined swinging and front operating state," and "propelling state."

According to a process of determining an operation state, in case the input signal from the key state detection sensor 77 represents other than an engine ON state, then the "engine shutdown state" is determined. In case the input signal from the key state detection sensor 77 represents the engine ON state, a locked state is determined using the input signal from the locked state detection sensor 78 in a next step. In case the lock lever 8 is in the locked state, the "operation locked state" is determined. Furthermore, in case the lock lever 8 is in an unlocked state, an operation state of the operation lever device 5 is determined using the input signal from the lever operation amount sensors 79. In case the operation lever device 5 has not been operated at all, the "operation standby state" is determined. In case the lever operation amount sensors 79 have been operated in some way, the "working state" is determined, and a detailed state thereof is determined depending on whether the hydraulic excavator 1 is propelled or swung or the front work implement 6 is operated. Specifically, if the hydraulic excavator 1 is propelled, the "propelling state" is determined. If the hydraulic excavator 1 is swung only, the "swinging state" is determined. If only the front work implement 6 is operated, then the "front working state" is determined. If the hydraulic excavator 1 is swung and at the same time the front work implement 6 is operated, then the "combined swinging and front operating state" is determined.

Figure 12:
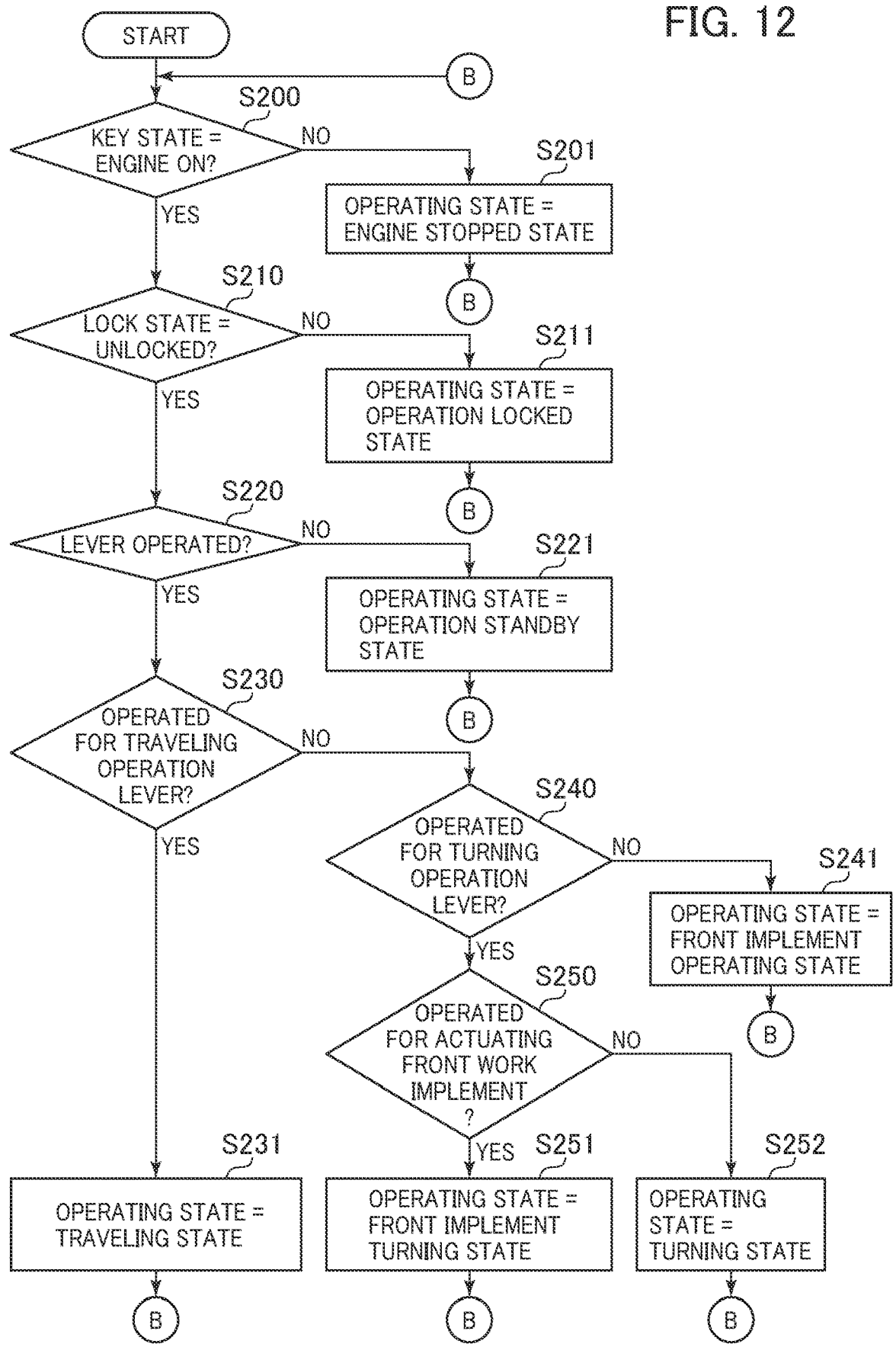
FIG. 12 is a flowchart illustrating processing details of an operation state determining process of an operation state determining section.

FIG. 12 is a flowchart illustrating processing details of the operation state determining process of the operation state determining section.

In FIG. 12, the operation state determining section 61B first determines whether the key state is the engine ON state or not on the basis of the input signal from the key state detection sensor 77 (step S200). If the determined result in step S200 is NO, then the operation state of the hydraulic excavator 1 is determined as the "engine shutdown state" (step S201), and control returns to the processing of step S200.

Furthermore, if the determined result in step S200 is YES, then the operating state determiner 61B determines whether the lock lever 8 is in the locked state or not (step S210) on the basis of the input signal from the locked state detection sensor 78. If the determined result in step S210 is NO, then the operation state of the hydraulic excavator 1 is determined as the "operation locked state" (step S211), and control returns to the processing of step S200.

Furthermore, if the determined result in step S210 is YES, then the operating state determiner 61B determines whether the operation lever device 5 is operated or not on the basis of the input signals from the lever operation amount sensors 79 (step S220). If the determined result in step S220 is NO, then the operation state of the hydraulic excavator 1 is determined as the "operation standby state" (step S221), and control returns to the processing of step S200.

Furthermore, if the determined result in step S220 is YES, then the operating state determiner 61B determines whether the operation lever device 5 is operated for propelling the hydraulic excavator 1 or not (step S230). If the determined result in step S230 is YES, then the operation state of the hydraulic excavator 1 is determined as the "propelling state" (step S231), and control returns to the processing of step S200.

Furthermore, if the determined result in step S230 is NO, then the operating state determiner 61B determines whether the operation lever device 5 is operated for swinging the hydraulic excavator 1 or not (step S240). If the determined result in step S240 is NO, then the operation state of the hydraulic excavator 1 is determined as the "front working state" (step S241), and control returns to the processing of step S200.

Furthermore, if the determined result in step S240 is YES, then the operating state determiner 61B determines whether the operation lever device 5 is operated for driving the front work implement 6 or not (step S250). If the determined result in step S250 is YES, then the operation state of the hydraulic excavator 1 is determined as the "combined swinging and front operating state" (step S251), and control returns to the processing of step S200.

Furthermore, if the determined result in step S250 is NO, then the operation state of the hydraulic excavator 1 is determined as the "swinging state" (step S252), and control returns to the processing of step S200.

The detection alert area computing section 61C determines an area (detection target area) where a worker (i.e., a worker tag 40 carried by a worker) is to be detected, and areas (proximity notification target areas) where the proximity of a worker is to be indicated, on the basis of the turning radius calculated by the turning radius computing section 61A and the operation state determined by the operation state determining section 61B.

Figure 15:
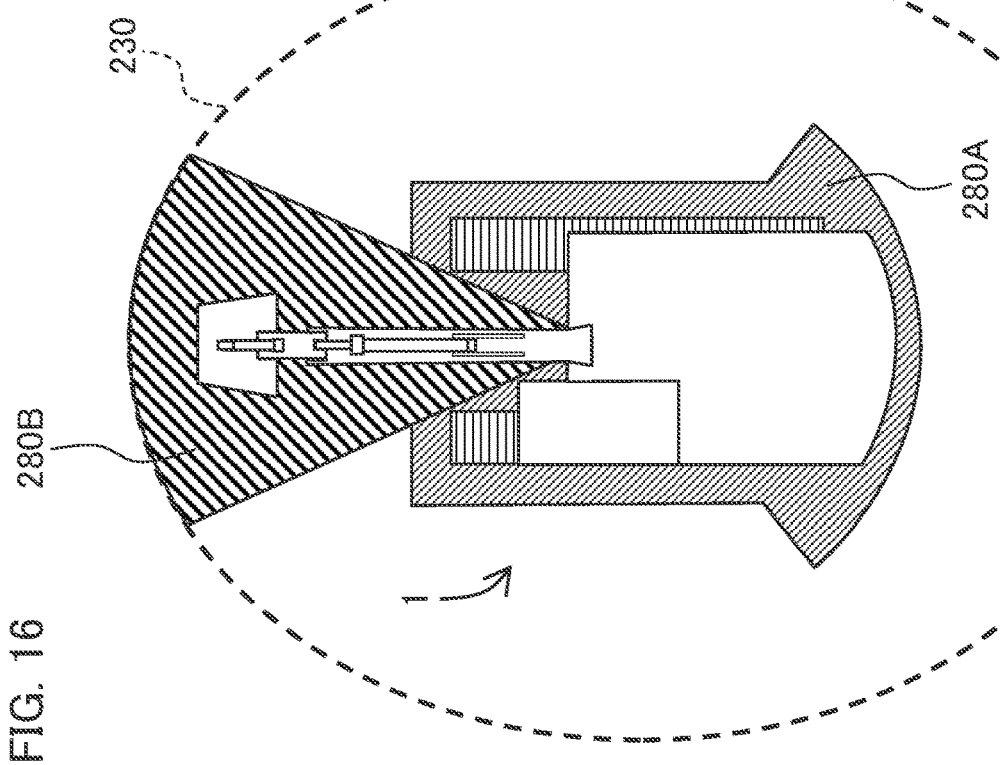
FIG. 15 is a view illustrating an example of a detection target area in an operation standby state.
Figure 16:
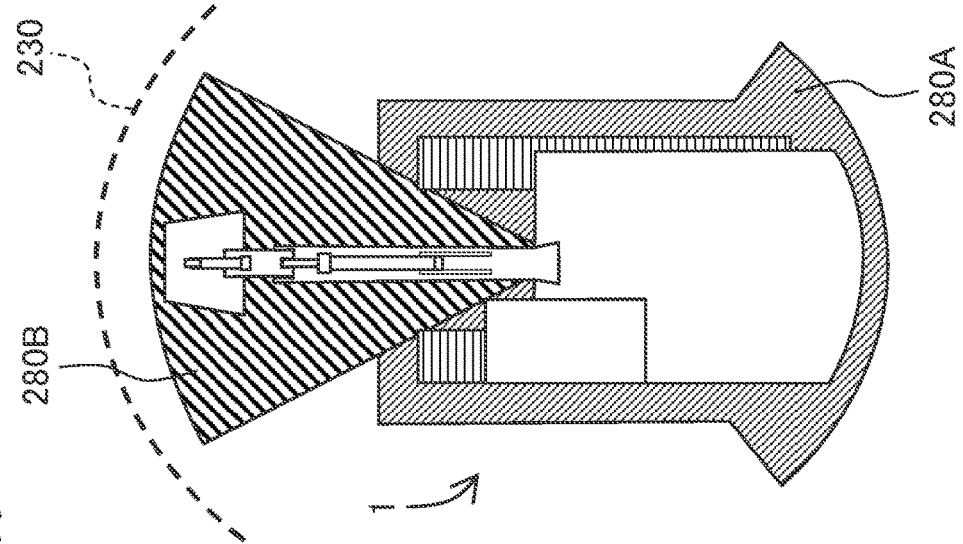
FIG. 16 is a view illustrating an example of a detection target area in a front implement operating state among working states.
Figure 18:
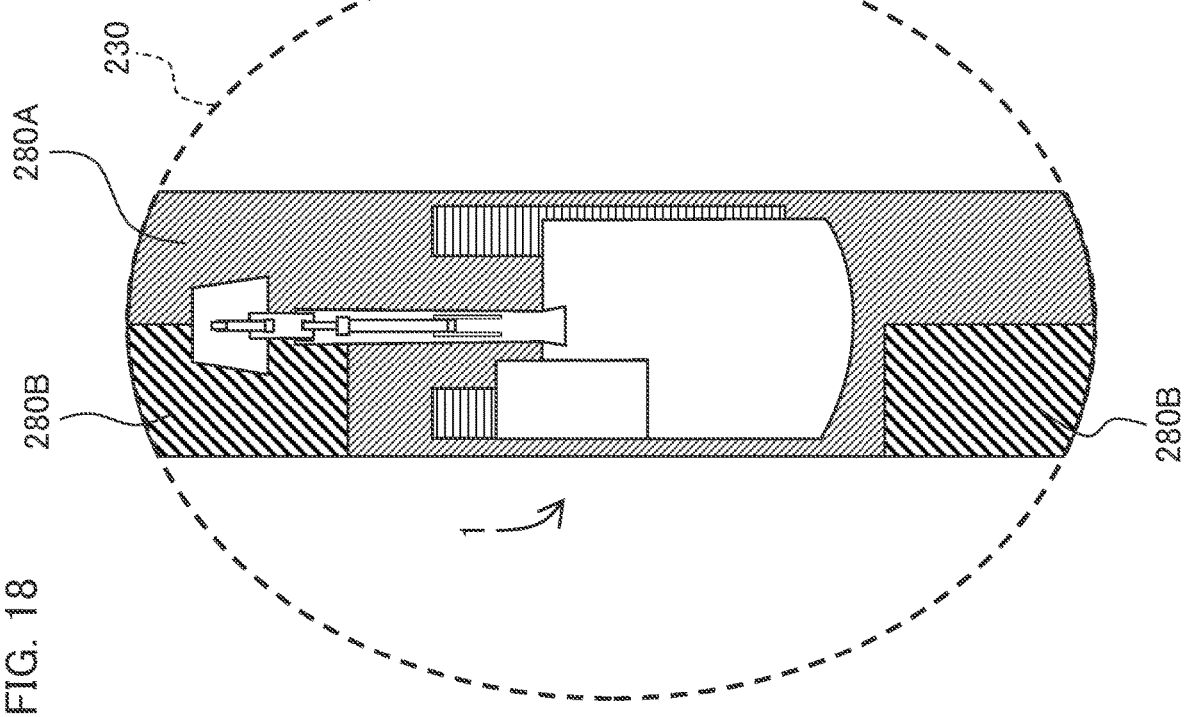
FIG. 18 is a view illustrating an example of a detection target area in a propelling state among working states.
Figure 17:
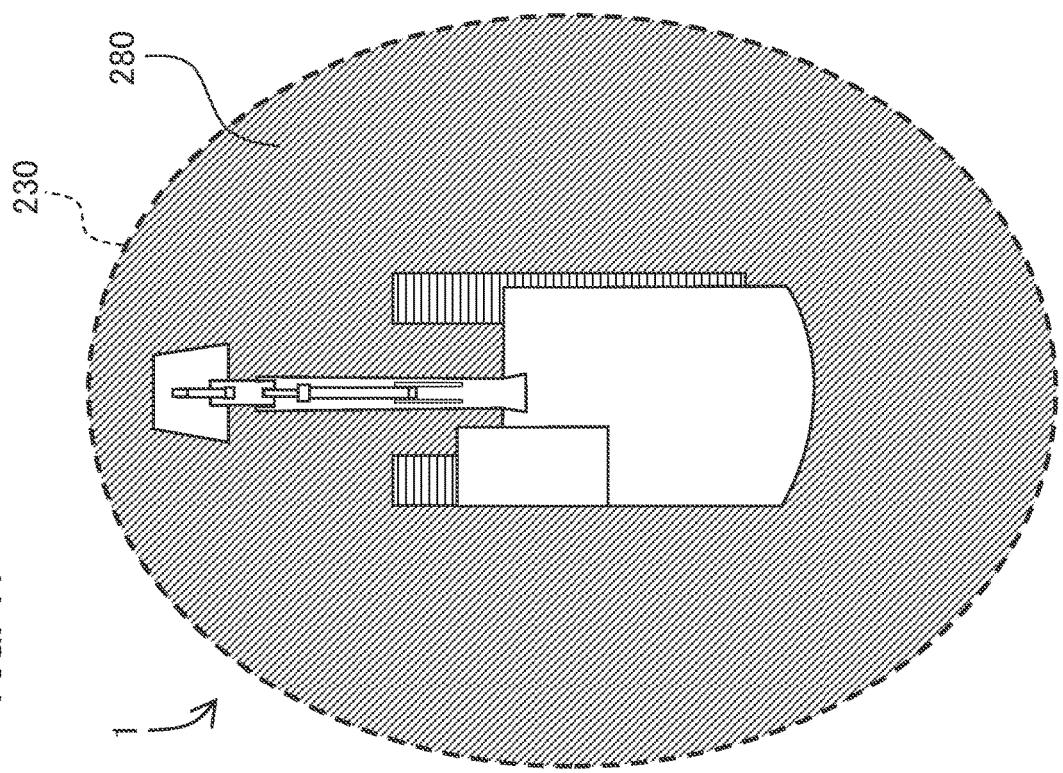
FIG. 17 is a view illustrating an example of a detection target area in a swinging state among working states.

FIGS. 15 through 18 are diagrams illustrating examples of a detection target area and proximity notification target areas. FIG. 15 illustrates an example in the operation standby state, FIG. 16 illustrates an example in the front working state among the working states, FIG. 17 illustrates an example in the swinging state among the working states, and FIG. 18 illustrates an example in the propelling state among the working states.

In FIGS. 15 through 18, a detection target area 230 is an area where the information of a worker is acquired through a worker tag 40. If the detection target area 230 is set to a larger area, then the information of a worker in the larger area is obtained. As described later, in the worker proximity notification system 10 according to the present embodiment, the detection target area 230 is used to determine the likelihood of calculated worker position values calculated from the GNSS or as an alternative value for the position of a worker in the case of a GNSS positioning failure. In view of the detection target area 230 used to determine the likelihood of a calculated worker position values calculated or as an alternative value for the position of a worker, it is desirable that the detection target area 230 should be as small as possible. According to the present embodiment, as illustrated in FIGS. 15 through 18, irrespectively of the working state of the hydraulic excavator 1, at least the major axis of an elliptical shape representing the detection target area 230 is set to a value slightly larger than the turning radius output from the turning radius computing section 61A at all times.

In FIGS. 15 through 18, proximity notification target areas 280 (280A, 280B) are an area where the proximity of a worker (worker tag 40) is to be indicated, and are set depending on the working state of the hydraulic excavator 1. A process of establishing the proximity notification target areas 280 (280A, 280B) in each of the working states ("engine shutdown state," "operation locked state," "operation standby state," and "working state") of the hydraulic excavator 1 will hereinafter be described below.

In case the operation state is the engine shutdown state, since the hydraulic excavator 1 does not move, there is no possibility that hydraulic excavator 1 would contact a worker and there is no need to indicate the proximity of a worker, so that a detection target area and proximity notification target areas are not established. Furthermore, the worker proximity notification system 10 that is incorporated in the hydraulic excavator 1 is assumed to obtain a power supply from the hydraulic excavator 1 for energizing various devices of the worker proximity notification system 10. Therefore, for example, the worker proximity notification system 10 is linked with the engine on the hydraulic excavator 1 for their starting, so that the worker proximity notification system 10 will not be started in the engine shutdown state.

In case the operation state is the operation locked state, since the hydraulic excavator 1 does not move even when the operation lever device 5 is manipulated, there is no possibility that hydraulic excavator 1 may contact a worker and there is no need to indicate the proximity of a worker. However, in order to reduce the risk of contacting a worker at the time the hydraulic excavator 1 starts to operate, it is effective to confirm whether a worker is present in the vicinity of the hydraulic excavator 1 or not before the lock lever 8 is unlocked. In the operation locked state, therefore, only a worker is detected and detected information of a worker is displayed on the display device 81, but no proximity notification is issued. As no proximity notification is issued, proximity notification target areas are not established.

In case the operation state is the operation standby state, the hydraulic excavator 1 does not move. When the operation lever device 5 is manipulated, since the hydraulic excavator 1 immediately put into the working state, it may possibly contact a worker. Therefore, in case a worker is present in the vicinity of the hydraulic excavator 1, it is desirable to issue a proximity notification. Furthermore, in the operation standby mode, there is a possibility that an assistant worker may be present in the vicinity of the front work implement 6. Therefore, it is desirable to establish different proximity notification target areas for assistant workers and other workers. As a way of reducing the risk of contact between the hydraulic excavator 1 and a worker, it is effective for the operator to confirm whether a worker is present in the vicinity of the hydraulic excavator 1 or not before it goes into the working state as with the operation locked state. Consequently, in the operation standby state, a worker is detected and detected information of a worker is displayed on the display device 81 in as large an area as possible, and a proximity notification is issued only in an area very close to the hydraulic excavator 1. A proximity notification target area around a front portion of the hydraulic excavator 1 is determined according to the calculated result from the turning radius computing section 61A. Furthermore, a proximity notification target area around a rear portion of the hydraulic excavator 1 is determined in view of the radius of a rear end of the hydraulic excavator 1. In the operation standby state, therefore, proximity notification target areas 280A and 280B depicted hatched in FIG. 15 are established. However, an assistant worker may need to be present in the vicinity of the front work implement 6 for operation assistance. Therefore, with respect to a worker tag 40 with a tag ID and an attribute set to "assistant worker," no proximity notification is issued in the proximity notification target area 280B near the front work implement 6, and a proximity notification is issued only in the proximity notification target area 280A. Note that, With respect to workers other than assistant workers, a proximity notification is issued in both the proximity notification target areas 280A and 280B.

In case the operation state is the working state, the hydraulic excavator 1 is moving and greatly runs the risk of contacting workers, and the positional relationship between the hydraulic excavator 1 and workers varies from time to time. Therefore, in case there is a worker in an area to which the hydraulic excavator 1 is expected to approach in a short time when the hydraulic excavator 1 is propelled or swung or the front work implement operates, it is desirable to issue a proximity notification. A process of establishing proximity notification target areas 280 (280A, 280B) when the hydraulic excavator 1 is in each of the working states ("front working state," "swinging state," "combined swinging and front operating state," and "propelling state.") will hereinafter be described below.

In case the operation state is the front working state among the working states, since the posture of the front work implement 6 varies, the area reached by the front work implement 6 in the front portion of the hydraulic excavator 1 changes from time to time. When the hydraulic excavator 1 swings, the operation state thereof instantaneously changes to the swinging state or the combined swinging and front operating state, possibly causing the front work implement 6 to reach a right area in front of the hydraulic excavator 1 or a left area in front of the hydraulic excavator 1 and causing the rear end portion of the hydraulic excavator 1 to reach a right area behind the hydraulic excavator 1 or a left area behind the hydraulic excavator 1. In the front working state, therefore, a proximity notification target area in front of the hydraulic excavator 1 may be set to an area slightly larger than indicated by the turning radius input from the turning radius computing section 61A, and a proximity notification target area sideways of the hydraulic excavator 1 may be set to an area in view of possible swinging movement though it is limited more closely to the work machine 1 than the proximity notification target area in front of the hydraulic excavator 1. A proximity notification target area behind the hydraulic excavator 1 may cover an area close to the rear end portion of the work machine 1. In the front working state, therefore, areas 280A and 280B depicted hatched in FIG. 16 are established as proximity notification target areas where a proximity notification is to be issued. However, an assistant worker may need to be present in the vicinity of the front work implement 6 for operation assistance. Therefore, with respect to a worker tag 40 with a tag ID and an attribute set to "assistant worker," no proximity notification is issued in the proximity notification target area 280B near the front work implement 6, and a proximity notification is issued only in the proximity notification target area 280A. With respect to workers other than assistant workers, a proximity notification is issued in both the proximity notification target areas 280A and 280B.

In case the operation state is the swinging state among the working states, the positional relationship between the hydraulic excavator 1 and workers varies due to the swinging motion, resulting in a possibility that the front work implement 6 may reach the entire circumference around the hydraulic excavator 1. Therefore, a proximity notification target area is established using the turning radius input from the turning radius computing section 61A. In the swinging state, therefore, a range that is the same as the detection target area 230 is established as a proximity notification target area 280 depicted hatched in FIG. 17. Note that, in the swinging state, as the risk of contact between the hydraulic excavator 1 and a worker is high, it is desirable to issue a proximity notification even for an assistant worker in case the assistant worker is present in the vicinity of the hydraulic excavator 1. Consequently, in the swinging state, a proximity notification is issued for all workers in the proximity notification target area 280.

In case the operation state is the swinging and front operating state among the working states, since the hydraulic excavator 1 operates simultaneously in the front working state and the swinging state, a detection target area and proximity notification target areas may be determined in the same manner as in the front working state and the swinging state, e.g., in the same manner as the proximity notification target area 280 illustrated in FIG. 17.

In case the operation state is the propelling state among the working states, the propelling state is different from the other working states in that the hydraulic excavator 1 moves in its entirety forwardly or rearwardly. In view of the forward or rearward movement of the hydraulic excavator 1, it is desirable to set a detection target area to as large an area as possible forwardly and rearwardly of the hydraulic excavator 1. In the propelling state, therefore, proximity notification target areas 280A and 280B depicted hatched in FIG. 18 are established. In the propelling state, however, an assistant worker may possibly be present forwardly or rearwardly of the hydraulic excavator 1 for guidance. Therefore, with respect to a worker tag 40 with a tag ID and an attribute set to "assistant worker," no proximity notification is issued in the proximity notification target areas 280B positioned leftwardly in front of and behind the hydraulic excavator 1 and slightly spaced therefrom, and a proximity notification is issued only in the proximity notification target area 280A. Note that, with respect to workers other than assistant workers, a proximity notification is issued in both the proximity notification target areas 280A and 280B.

The worker position calculating section 62 has a worker position computing section 62A for calculating the position of a worker tag 40 with respect to the hydraulic excavator 1 using the positional information of the hydraulic excavator 1 that is acquired by the GNSS receiving device 50 and the positional information of the worker tag 40 that is included in the detected tag information output from the tag detecting device control section 23, and a worker position evaluating section 62B for evaluating the likelihood of the positional information of the worker tag 40 calculated by the worker position computing section 62A on the basis of the detection target area 230 output from the detection alert area determining section 61 and calculating the position of the worker tag 40 on the basis of the evaluated result.

The worker position computing section 62A calculates the position of a worker tag 40 with respect to the hydraulic excavator 1 using the received GNSS data of the hydraulic excavator 1 that is output from the GNSS receiving device 50 and the received GNSS data of the worker tag 40 that is included in the detected tag information output from the tag detector 20, performs a process of generating worker position information (see FIG. 9) (a worker position information generating process), the worker position information representing the worker ID that identifies a worker carrying the worker tag 40 and calculated worker position values that indicate the position of each worker tag 40, and outputs the generated worker position information to the worker position evaluating section 62B. The worker ID may be a different ID related to the tag ID of the worker tag 40 or the same ID as the tag ID.

The worker position computing section 62A extracts received GNSS data of the tag ID corresponding to the worker ID from the detected tag information output from the tag detector 20 and processes the extracted GNSS data. At this time, if the GNSS positioning quality information for the hydraulic excavator 1 or the worker tag 40 represents "IMPOSSIBLE TO POSITION," then a three-dimensional position has not been calculated according to GNSS, and no positional information is included in the received GNSS data or wrong positional information entirely different from actual positional information is included in the received GNSS data. Accordingly, the position of the worker with respect to the hydraulic excavator 1 cannot be calculated on the basis of the received GNSS data, or stated otherwise, a wrong position entirely different from an actual position may possibly be calculated. The worker position computing section 62A confirms the GNSS positioning quality information included in the received GNSS data that is output from the GNSS receiving device 50. If the GNSS positioning quality information represents "IMPOSSIBLE TO POSITION," then the worker position computing section 62A sets the calculated three-dimensional position values for all workers to "N/A (IMPOSSIBLE TO CALCULATE)." If the GNSS positioning quality information represents other than "IMPOSSIBLE TO POSITION," then the worker position computing section 62A calculates a transformation matrix TGm for transforming the calculated three-dimensional position values calculated according to the GNSS into positional coordinates with reference to the hydraulic excavator 1, i.e., positional coordinates in a coordinate system with reference to the hydraulic excavator 1 (a work machine coordinate system) using the calculated three-dimensional position values of the hydraulic excavator 1 included in the received GNSS data and information about the installed position of the GNSS receiving device 50 that is held in the GNSS receiving device installation position information storage section 350 of the storage section 60B. The work machine coordinate system is a coordinate system that has an origin positioned on the ground surface at the center of swinging motion of the hydraulic excavator 1, an X-axis extending in the leftward and rightward directions of the hydraulic excavator 1 (the rightward direction is positive), a Y-axis extending in the forward and rearward directions of the hydraulic excavator 1 (the forward direction is positive), and a Z-axis extending in the upward and downward directions of the hydraulic excavator 1 (the upward direction is positive). For calculating the position of a worker, the worker position computing section 62A extracts the received GNSS data of the worker ID from the detected tag information and confirms the GNSS positioning quality information included in the received GNSS data of the worker ID. In case the GNSS positioning quality information of the worker ID represents "IMPOSSIBLE TO POSITION," the worker position computing section 62A sets the calculated worker position values of the worker ID to "N/A." In case the GNSS positioning quality information of the worker ID represents other than "IMPOSSIBLE TO POSITION," the worker position computing section 62A calculates a worker position (xm, ym, zm) in the work machine coordinate system by substituting the calculated three-dimensional position values (xG, yG, zG) calculated according to the GNSS into the equation depicted below, and uses the values of the calculated worker position as the calculated worker position values of the worker ID. Then, the worker position computing section 62A calculates calculated worker position values of all worker IDs extracted from the detected tag information, and outputs the calculated worker position values in association with the respective worker IDs.

[Math. 1]

$$\begin{pmatrix} xm \\ ym \\ zm \end{pmatrix} = TGm \cdot \begin{pmatrix} xG \\ yG \\ zG \end{pmatrix} \qquad \text{(equation 1)}$$

In the above equation (1), (xG, yG, zG) represents the calculated three-dimensional position values of the worker according to the GNSS, (xm, ym, zm) the position of the worker in the work machine coordinate system, and TGm the coordinate transformation matrix.

Figure 13:
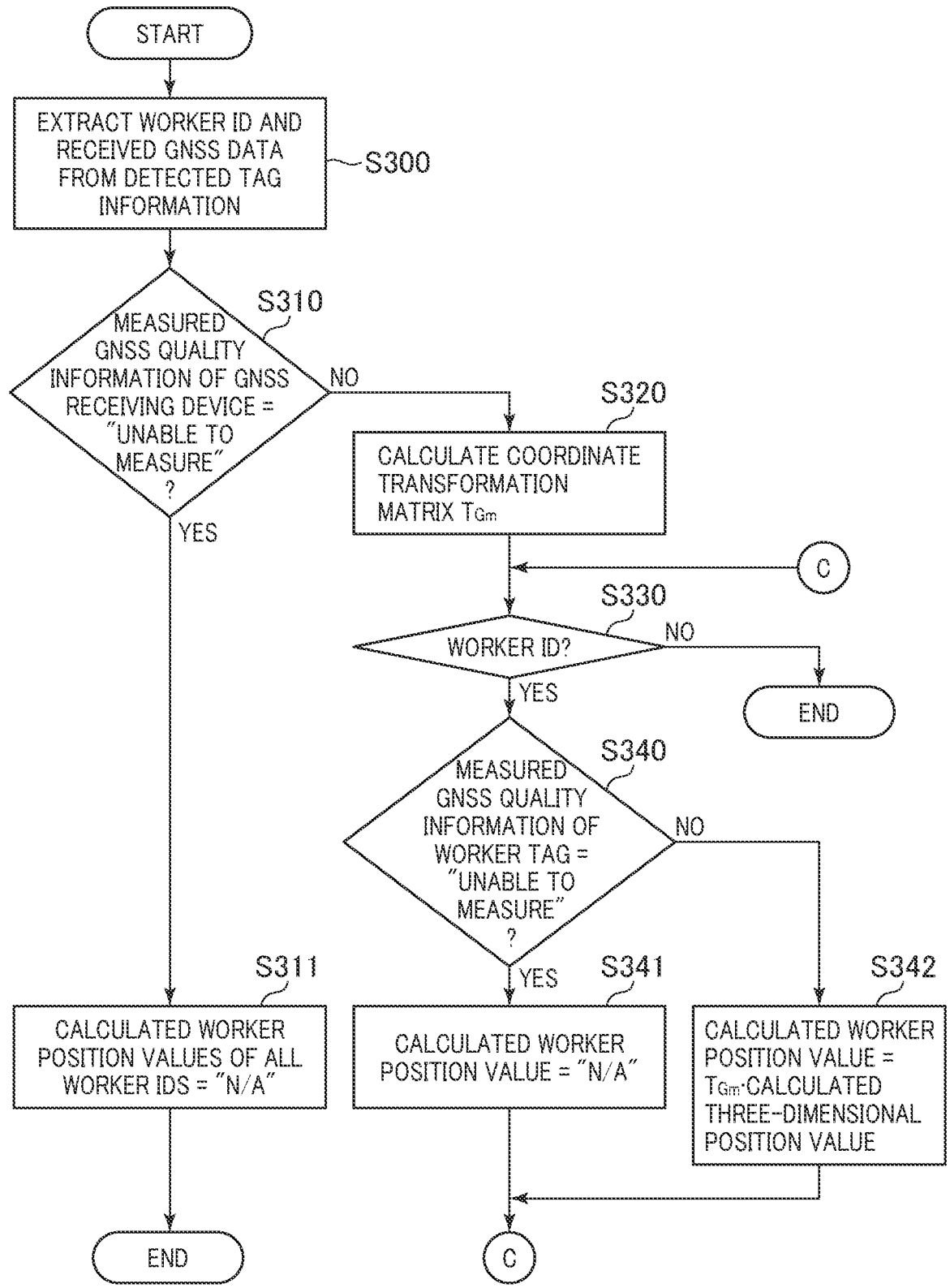
FIG. 13 is a flowchart illustrating processing details of a worker position information generating process of a worker position calculating section.

FIG. 13 is a flowchart illustrating processing details of the worker position information generating process of the worker position computing section.

In FIG. 13, the detected information output section 29 extracts the tag ID and the received GNSS data corresponding to each worker ID from the detected tag information that is output from the tag detector 20 (step S300). The worker position computing section 62A determines whether the GNSS positioning quality information included in the received GNSS data that is output from the GNSS receiving device 50 represents "IMPOSSIBLE TO POSITION" or not (step S310). If the determined result is YES in step S310, then the worker position computing section 62A sets the calculated worker position values corresponding to all workers in the worker position information to "N/A" (step S311), whereupon the processing sequence it ended. If the determined result is NO in step S310, then the worker position computing section 62A calculates the coordinate transformation matrix TGm (step S320), and determines whether there is received GNSS data corresponding to a worker ID for which a worker position has not been calculated (step S330). If the determined result is NO in step S330, then the processing sequence it ended. If the determined result is YES in step S330, then the worker position computing section 62A determines whether the GNSS positioning quality information included in the received GNSS data generated by the worker tag 40 represents "IMPOSSIBLE TO POSITION" or not (step S340). If the determined result is YES in step S340, then the worker position computing section 62A sets the calculated worker position values corresponding to the corresponding worker ID in the worker position information to "N/A" (step S341), after which control returns to the processing of step S330. If the determined result is NO in step S340, then the worker position computing section 62A calculates calculated worker position values from the calculated three-dimensional position values using the coordinate transformation matrix TGm, and inputs the calculated worker position values into the worker position information (step S342), after which control returns to the processing of step S330.

The worker position evaluating section 62B evaluates the likelihood of the worker position information output from the worker position computing section 62A using the detection target area 230 established by the detection alert area determining section, and outputs worker proximity information including information representing the name of each worker, information representing the attribute of each worker, and information representing the area where each worker is present (a worker presence area). As the induced magnetic field generated by the magnetic field generating device 21 is less vulnerable to reflections and shields have small effects on the distance that the induced magnetic field is able to cover, the magnetic field detectability area 221 based on the detection target area 230 is less liable to be affected by the surrounding environment. On the other hand, there is a possibility that the calculated three-dimensional position values according to the GNSS include large errors because of the satellite layout and the surrounding environment. Since a worker tag 40 generates a radio-wave signal 140 only when it detects a magnetic field signal 120, the fact that the worker position information is available means that the working tag 40 is present in the magnetic field detectability area 221 based on the detection target area 230. Namely, if the calculated worker position values calculated using the received GNSS data point to a position outside of the detection target area 230, then the calculated values are considered to be suffering from an error due to a GNSS positioning error. Consequently, the worker position evaluating section 62B performs a worker position evaluating process for determining whether the calculated position values calculated according to the GNSS and the detected information of the induced magnetic field contradict each other or not, i.e., the likelihood of the positional information according to the GNSS, thereby finalizing a worker presence area, on the basis of whether the calculated worker position values represented by the worker position information fall within the detection target area 230 or not, generates worker proximity information (see FIG. 10) representing worker names and worker attributes combined together, and outputs the generated worker proximity information to the notification command generating section 63.

Figure 14:
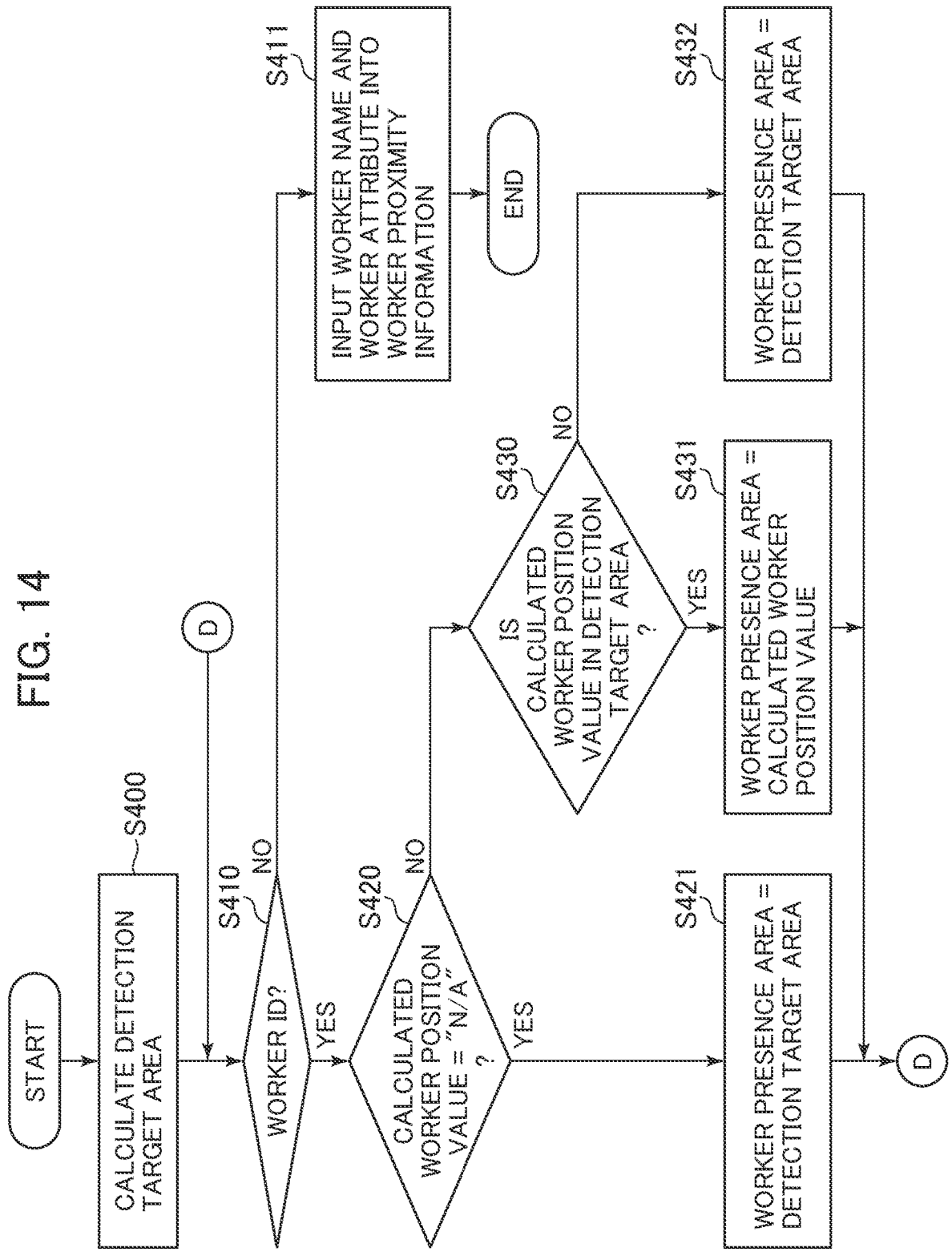
FIG. 14 is a flowchart illustrating processing details of a worker position evaluating process of a worker position evaluating section.

FIG. 14 is a flowchart illustrating processing details of the worker position evaluating process of the worker position evaluating section.

In FIG. 14, the worker position evaluating section 62B first calculates an area (hereinafter referred to as "detection target area 230" if it does not need to be distinguished therefrom) in the work machine coordinate system of the detection target area 230 from the information about the installed position of the magnetic field generating device 21 that is held by the magnetic field generating device installation position information storage section 321 of the storage section 60B and from the detection target area 230 that is output from the detection alert area determining section 61, in step S400.

Then, the worker position evaluating section 62B determines whether there is a worker ID for which a worker presence area has not been calculated or not (step S410). If the determined result is NO in step S410, then the worker position evaluating section 62B reads the worker name and worker attribute of the worker ID from the worker information storage section 340 of the storage section 60B, and inputs the read worker name and worker attribute into the worker proximity information in association with each worker ID (step S411), after which the processing sequence is ended.

If the determined result is YES in step S410, then the worker position evaluating section 62B determines whether the calculated worker position values corresponding to the worker ID represent "N/A" or not (step S420). If the determined result is YES in step S420, then the worker position evaluating section 62B inputs the detection target area 230 as the area in which the worker is present (the worker presence area), corresponding to the worker ID in the worker proximity information, after which control returns to the processing of step S410.

Furthermore, if the determined result is NO in step S420, then the worker position evaluating section 62B determines whether the calculated worker position values fall within the detection target area 230 or not (step S430). If the determined result is YES in step S430, then the worker position evaluating section 62B determines the calculated worker position values as likely, and inputs the calculated worker position values into the worker presence area of the worker ID (step S431), after which control returns to the processing of step S410.

Furthermore, if the determined result is NO in step S430, i.e., if the calculated worker position values are outside of the detection target area 230, then the worker position evaluating section 62B determines that the GNSS positioning is suffering from an error, and inputs the detection target area 230 as alternative values for the calculated worker position values calculated according to the GNSS as the worker presence area of the worker ID (step S432), after which control returns to the processing of step S410.

The notification command generating section 63 generates a notification command, i.e., a display command for the display device 81 and an alert command for the alerting device 82, using the worker proximity information that is output from the worker position calculating section 62 and the detection target area 230 and the proximity notification target areas 280 that are output from the detection alert area determining section 61.

The contents of the display command and the alert command differ depending on whether a detected worker is a target for a proximity notification or not. Therefore, the notification command generating section 63 determines whether each worker included in the worker proximity information is a target for a proximity notification or not, from the proximity notification target areas 280 output from the detection alert area determining section 61 and the worker attribute and a worker presence area 240 that are included in the worker proximity information. If the area where the worker is present (the worker presence area 240) falls within the area where a proximity notification is to be issued for the worker attribute, then the notification command generating section 63 generates and outputs a notification command (a display command and an alert command) with respect to the worker.

Figure 19:
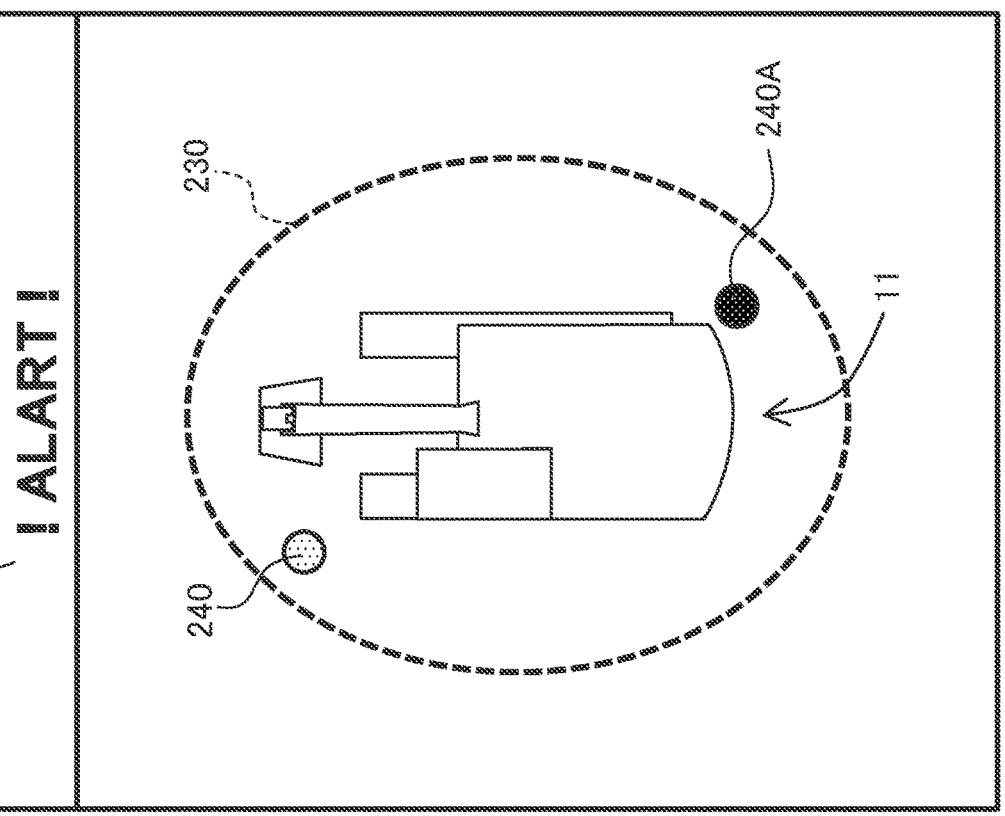
FIG. 19 is a view illustrating an example of a displayed image on a display device.
Figure 20:
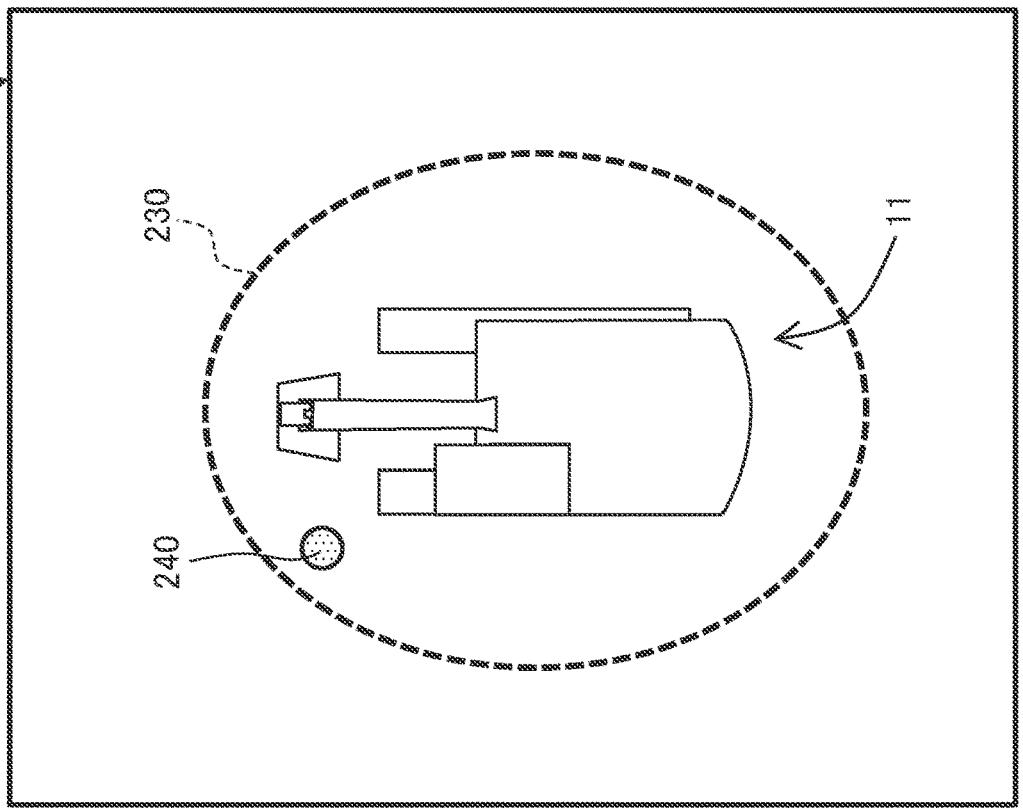
FIG. 20 is a view illustrating another example of a displayed image on the display device.

A display command that is output from the notification command generating section 63 to the display device 81 may be an instruction for enabling the display device 81 to present a display illustrated in FIG. 19, for example. The display illustrated in FIG. 19 includes a detection target area 230 plotted around an icon 11 representing a plan view of the hydraulic excavator 1 and disposed centrally in the detection target area 230. In case a worker is detected in the detection target area 230 and worker proximity information is present, a worker presence area 240 included in the worker proximity information is plotted. The worker presence area 240 should desirably be displayed in a different mode depending on whether the worker is a proximity notification target or not. For example, as illustrated in FIG. 20, a worker presence area 240A where a worker is present as a proximity notification target is displayed as highlighted compared with the worker presence area 240 that it not a proximity notification target. Furthermore, in case even one worker is present as a proximity notification target, a proximity notification is issued as a display for indicating the proximity of the worker. The display as the proximity notification may be an alert display 650 displayed in a display area of the display device, as illustrated in FIG. 20, for example. The content of the display as the proximity notification may include information representing the turning radius, worker names, the number of workers being detected, etc. added to the display illustrated in FIG. 20. The worker presence area 240 of the worker proximity information may be displayed in different modes in case the detailed positions of all workers are identified, in case the GNSS is suffering a positioning failure, and in case the detailed positions of workers are not identified due to a positioning error.

It is determined whether an alert command is to be output from the notification command generating section 63 to the alerting device 82 or not depending on whether there is a proximity notification command or not. If even one worker is present as a proximity notification target in the proximity notification target areas 280, an alert command is output. If not, no alert command is output. Different types of alerts that vary stepwise may be output depending on information representing the number of workers detected in the proximity notification target areas 280, the distances between workers and the hydraulic excavator 1, etc.

Operation and advantages of the present embodiment arranged as described above will be described below.

Generally, in case a worker in close proximity with a work machine is detected and the operator of the work machine is notified of the worker with an alert or the like, it is necessary to be careful enough not to excessively alert and bother the operator. For preventing the operator from being excessively alerted, it is important to appropriately adjust an area where the presence of a worker with respect to the work machine is to be detected and a worker presence alert is to be issued to the work machine, in various situations. According to a technology that does not take into account the detection of a worker with respect to a work machine and the adjustment of an area as an alert target, the operator of the work machine tends to be excessively alerted and felt bothered, possibly resulting in a reduction in working efficiency.

According to the present embodiment, the worker proximity notification system 10 incorporated in the work machine (e.g., the hydraulic excavator 1) having the machine body with the propulsive device (e.g., the lower track structure 2 and the upper swing structure 3) the multi-joint work implement (e.g., the front work implement 6) mounted on the machine body and including the plural front members (e.g., the boom 6A, the arm 6B, and the bucket 6C) that are angularly movably interconnected, and the operating device (e.g., the operation lever device 5) for outputting operating signals for operating the work implement, includes the GNSS receiving device 50 for acquiring positional information of the work machine, at least one magnetic field generating device 21 fixed to the machine body at a predetermined position, for generating a magnetic field signal 120 including a magnetic field ID for identifying a source for generating the magnetic field signal, at least one worker tag 40 carried by the operator of the work machine and a worker working outside of the work machine and having the GNSS receiving section 45 for acquiring positional information of the worker tag, the worker tag 40 being responsive to the magnetic field signal generated by the magnetic field generating device for sending a radio-wave signal 40 including at least the magnetic field ID included in the received magnetic field signal, a tag ID for allowing the worker tag that has received the magnetic field signal to identify itself, and positional information of the worker tag, the tag information receiving device 22 for receiving a radio-wave signal sent from the worker tag, the tag detecting device control section 23 for controlling the magnetic field generating device with a detection command, acquiring information included in the radio-wave signal received by the tag information receiving device, and outputting the acquired information as detected tag information, the detection alert area determining section 61 for determining a detection target area 230 where the position of a worker tag with respect to the work machine is a detection target, and a proximity notification target area 280 where the proximity of a worker tag is a proximity notification target in the detection target area, the worker position calculating section 62 for calculating the position of a worker tag based on the positional information of the work machine, the positional information of the worker tag, the detected tag information acquired by the tag detecting device control section, and the detection target area determined by the detection alert area determining section, and the notification command generating section 63 for generating a notification command and outputting the generated notification command to the notification device 80 to notify the operator of the work machine of the detection of the worker tag in case the worker tag is detected in the proximity notification target area on the basis of the calculated result from the worker position calculating section. Consequently, the proximity of a worker to the work machine can be detected accurately and the operator is prevented from being excessively alerted.

According to the present embodiment, in case the worker tag 40 detects the magnetic field signal 120 from the tag detector 20, the worker tag 40 returns the radio-wave signal 140. In case the tag detector 20 receives the radio-wave signal 140, it is recognized that the worker tag 40 is present in an area where it can detect the magnetic field signal 120. In case the tag detector 20 does not receive the radio-wave signal 140, it is recognized that the worker tag 40 is present outside of the area where it can detect the magnetic field signal 120. As the induced magnetic field is less vulnerable to reflections and shields have small effects on the distance over which the induced magnetic field is detectable, it is reliably detected whether the worker tag 40 is present in a predetermined detectable area or not. The area where the magnetic field signal 120 is detectable is formed in an elliptical shape around the magnetic field generating device 21 of the tag detector 20, for example, and has a size determined by the intensity of the magnetic field signal 120 generated by the magnetic field generating device 21 and the magnetic field sensitivity of the worker tag 40. However, such a magnetic field induction RFID function is unable to obtain detailed information about distances and directions though it can detect whether the worker tag 40 is present in the elliptical detectable area or not.

Meanwhile, The GNSS is a system for measuring the three-dimensional position (latitude, longitude, altitude) of the hydraulic excavator 1 or a worker on the basis of signals sent from a plurality of positioning satellites. Since the GNSS allows the three-dimensional positional information of the hydraulic excavator 1 and a worker (a worker tag 40) to be obtained, it is possible to calculate detailed positional relationship between the hydraulic excavator 1 and the worker. However, signals that are simultaneously obtained from at least four positioning satellites are required to calculate three-dimensional positions. Therefore, if signals from four or more positioning satellites are not obtained for the reason that the sky over the GNSS receiving device 50 is not open or the radio-wave environment is not good, then no three-dimensional positions cannot be obtained. Furthermore, as the positioning accuracy according to the GNSS is susceptible to the layout of positioning satellites, propagation delays due to radio-wave characteristics over radio-wave propagation routes from the positioning satellites to the GNSS receiving device 50, and reflections of radio waves caused by walls, buildings, etc., large errors may be caused in calculated three-dimensional position values.

Moreover, in the vicinity of large structures, work machines, materials, etc., concerns are raised about shields in the sky and radio-wave reflections. Particularly, since worker tags 40 that are carried by workers need to be lightweight and inexpensive, the worker tags 40 are more susceptible to the satellite layout and the surrounding environment than the GNSS receiving device 50.

In other words, the magnetic field induction RFID is able to obtain only information as to whether the position where a worker is present is within or outside of a predetermined detectable area, though it is capable of highly reliable detection. On the other hand, the GNSS positioning is less reliable as it is susceptible to the satellite layout and the surrounding environment, though it is able to obtain detailed three-dimensional positional information of the hydraulic excavator 1 and workers.

Then, the worker proximity notification system 10 according to the present embodiment is arranged to derive the position where a worker is present using the detection according to the magnetic field induction RFID function and the GNSS positioning. More specifically, the magnetic field induction RFID function is capable of reliably detecting the proximity of a worker tag 40 to the hydraulic excavator 1. In addition, the difference between the result of the GNSS positioning and the detected information according to the magnetic field induction RFID function is monitored, and only in the absence of that difference, the calculated position values according to the GNSS are used as detailed information as to the position where the worker tag 40 is present. Therefore, the proximity of the worker (the worker tag 40) to the hydraulic excavator 1 is reliably indicated and at an appropriate timing and by an appropriate process according to the operation state of the hydraulic excavator 1 and the positions of workers.

<First Modification>

Figure 21:
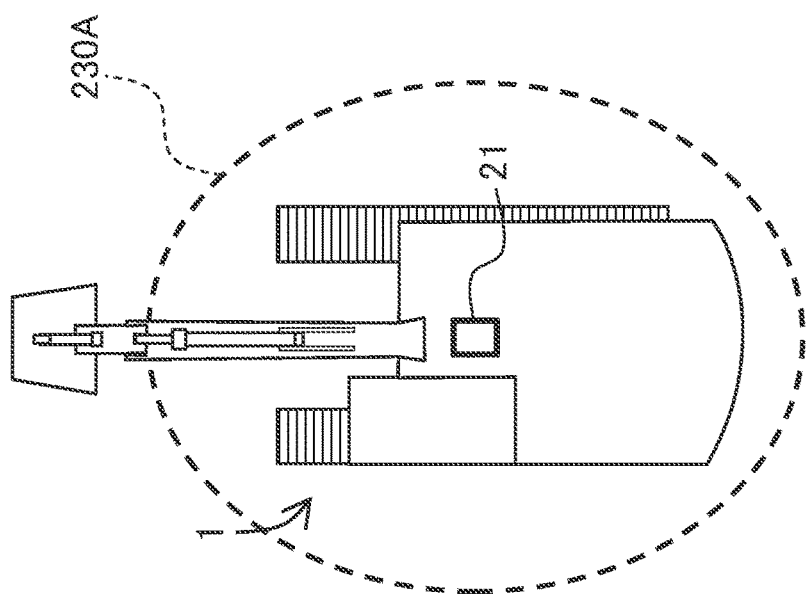
FIG. 21 is a view illustrating an example of the setting of a detection target area.

Note that, according to the present embodiment, the detection alert area determining section 61 establishes a detection target area 230 based on the turning radius output from the turning radius computing section 61A. However, the detection alert area determining section 61 may establish a detection target area depending on the maximum turning radius of the hydraulic excavator 1, for example, or may establish, as a detection target area 230A illustrated in FIG. 21, a certain area not depending on the turning radius, e.g., an area in the vicinity of the hydraulic excavator 1 that can highly possibly be reached instantaneously when the hydraulic excavator 1 is operated.

<Second Modification>

Figure 22:
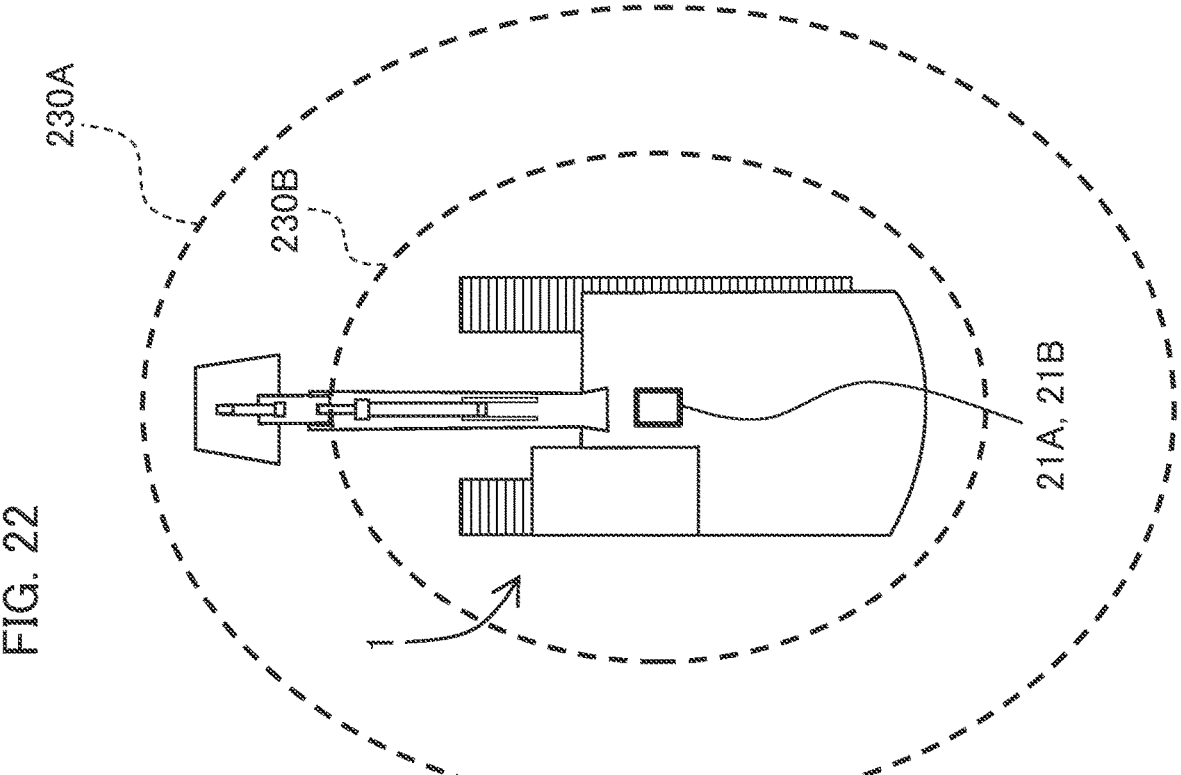
FIG. 22 is a view illustrating another example of the setting of a detection target area.

Furthermore, as illustrated in FIG. 22, the tag detector 20 includes two or more magnetic field generating devices 21A and 21B, e.g., two magnetic field generating devices 21A and 21B, and the magnetic field generating devices 21A and 21B generate magnetic field signals 120 having different magnetic field intensities and magnetic field IDs for establishing a plurality of detection target areas 230A and 230B having different ranges. Note that, in case two detection target areas 230A and 230B are established, the larger detection target area 230A is used to detect worker tags 40 and the smaller detection target area 230B is used to evaluate calculated worker position values according to the GNSS and also as a worker presence area, so that information of the worker tags 40 that are present in the larger detection target area 230A can be obtained and the accuracy of the worker presence area 240 is ensured.

<Third Modification>

Furthermore, using the received GNSS data of the hydraulic excavator 1 that is output from the GNSS receiving device 50 and the received GNSS data of the worker tag 40 included in the detected tag information that is output from the tag detector 20, the worker position computing section 62A generates worker position information including the worker ID and the calculated worker position values. The worker position evaluating section 62B determines the likelihood of the calculated worker position values according to whether the calculated worker position values included in the worker position information fall within the detection target area 230 in the work machine coordinate system or not, thereby finalizing a worker presence area 240.

At this time, the worker position computing section 62A calculates a worker position, and the worker position evaluating section 62B evaluates the worker position and calculates a worker presence area 240, as follows: The worker position computing section 62A calculates calculated worker area values in addition to the calculated worker position values, using the received GNSS data of the hydraulic excavator 1 that is output from the GNSS receiving device 50 and the received GNSS data of the worker ID included in the detected tag information 150 that is output from the tag detector 20. The calculated worker area values represent a worker position indicated by the calculated worker position values with a calculation error thereof added thereto. The calculation error of the calculated worker position values is derived from the GNSS positioning quality included in the received GNSS data of the GNSS receiving device 50 and the worker tag 40. For example, in case estimated positioning error values are given as the GNSS positioning quality, an elliptical area extending around the calculated worker position values disposed at its center and having radii represented by the estimated positioning error values in the latitude and longitude directions is used as the calculated worker area values. In case the number and layout of the satellites that are used in calculating positions, positioning states including Fix, Float, independent positioning, etc., are given as the GNSS positioning quality, the number and layout of the satellites, and estimated position calculating error values for the respective positioning states are stored as position calculating error information in the storage section 60B. The worker position computing section 62A derives the estimated position calculating error values by referring to the position calculating error information stored in the storage section 60B, and uses an elliptical area extending around the calculated worker position values disposed at its center and having radii represented by the estimated position calculating error values, as the calculated worker area values. The worker position computing section 62A calculates calculated worker area values for all worker IDs extracted from the detected tag information, and outputs worker position information including the worker IDs, the calculated worker position values, and the calculated worker area values.

The worker position evaluating section 62B evaluates the likelihood of calculated worker area values calculated according to the GNSS by comparing the detection target area 230 with the calculated worker area values of the worker ID included in the worker position information, and finalizes the worker presence area 240 of the worker to be output as worker proximity information.

Figure 24:
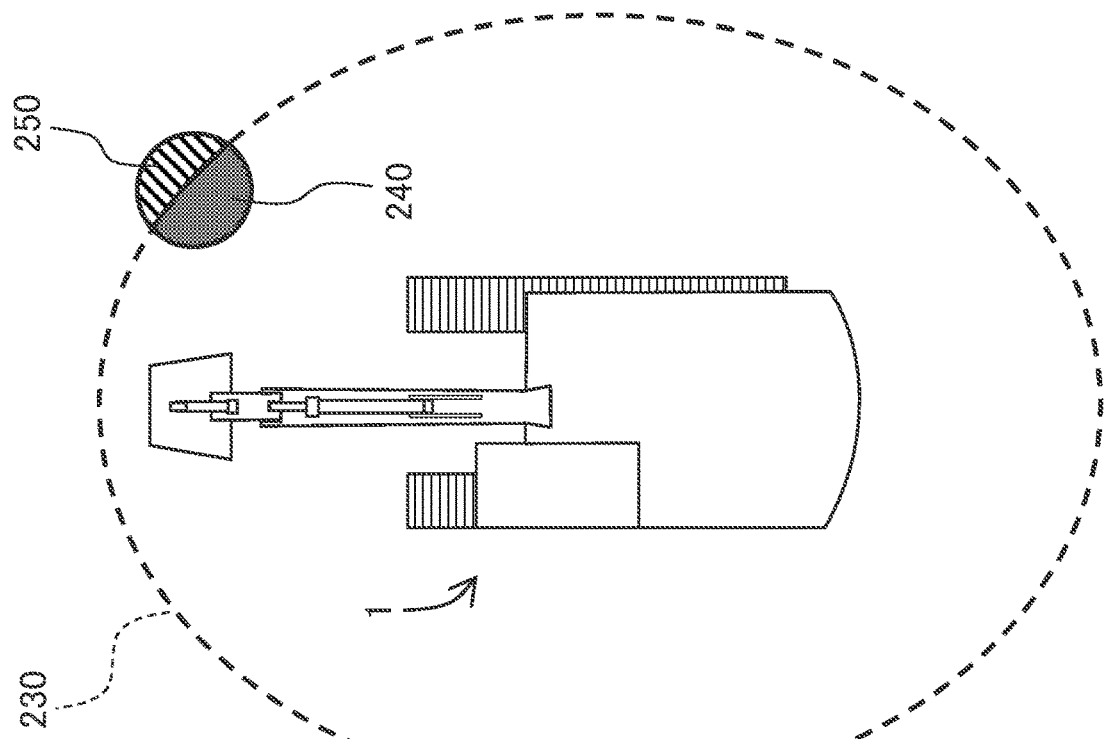
FIG. 24 is a view illustrating a process of evaluating a calculated worker area value and determining a worker presence area.
Figure 23:
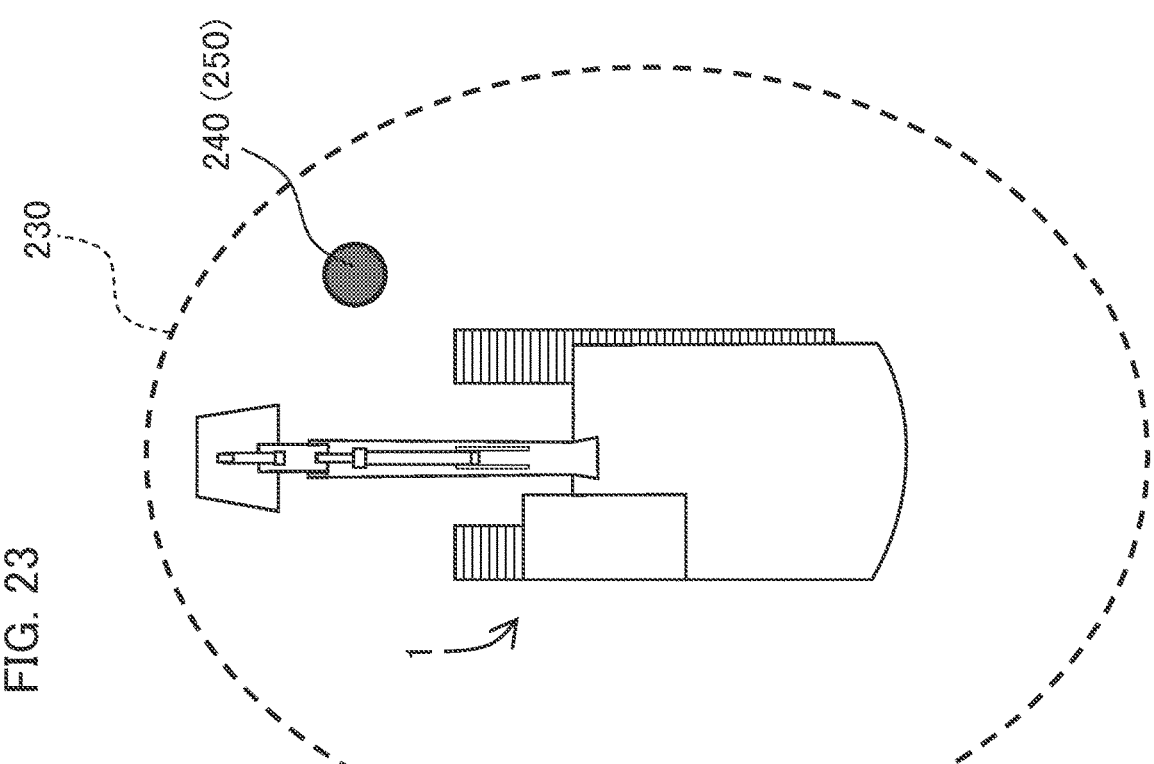
FIG. 23 is a view illustrating a process of evaluating a calculated worker area value and determining a worker presence area.
Figure 25:
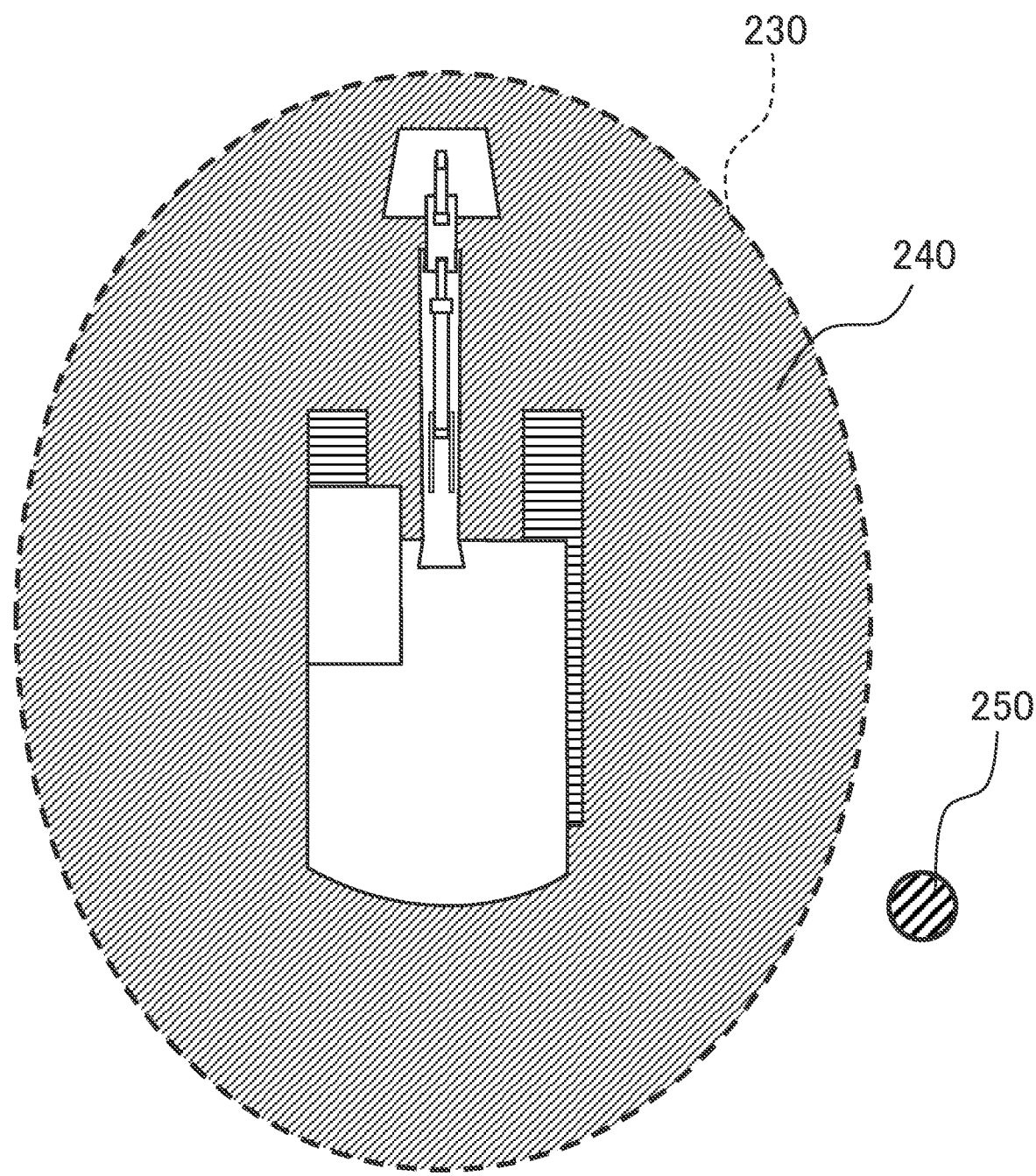
FIG. 25 is a view illustrating a process of evaluating a calculated worker area value and determining a worker presence area.

A process of evaluating calculated worker area values and determining a worker presence area 240 will be described below with reference to FIGS. 23 through 25. As illustrated in FIG. 23, in case calculated worker area values 250 are included in the detection target area 230, the calculated worker area values 250 are determined as likely and used as the worker presence area 240 of the worker ID. Furthermore, as illustrated in FIG. 24, in case calculated worker area values 250 are partly included in the detection target area 230 and partly positioned outside of the detection target area 230, the regions of the calculated worker area values 250 that are disposed in the detection target area 230 are used as the worker presence area 240 of the worker ID. Moreover, as illustrated in FIG. 25, in case calculated worker area values 250 are positioned outside of the detection target area 230, the positioning according to the GNSS is determined as suffering from an error, and the detection target area 230, rather than the calculated worker area values 250 according to the GNSS, is used as the worker presence area 240 of the worker ID. In case the calculated worker position values of the worker ID of the worker position information represent "N/A," the detection target area 230 is used as the worker presence area 240 of the worker ID, as is the case with the present embodiment. By thus establishing an assumed error range based on the GNSS positioning quality information and performing an evaluation in view of the error range, it is possible to determine the worker presence area 240 with higher accuracy.

<Fourth Modification>

Furthermore, according to the present embodiment, the hydraulic excavator 1 has been described as an example of work machine. However, the present invention is also applicable to a work machine having a work arm such as the front work implement 6 of the hydraulic excavator 1. For example, the work machine having the work arm may be a wheel loader having a multi-joint hydraulic work device on a front portion of a machine body.

Figure 26:
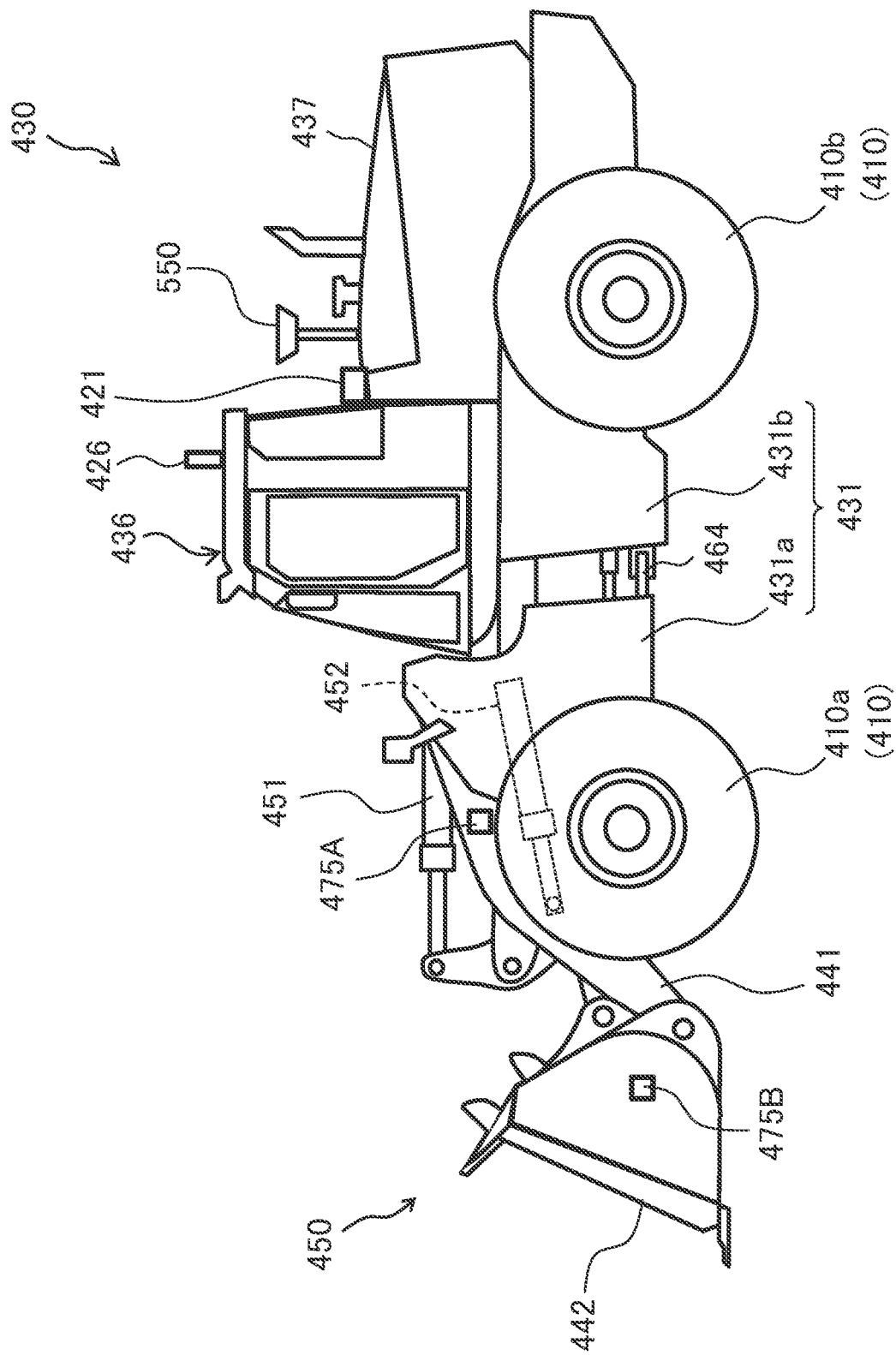
FIG. 26 is a side elevational view of a wheel loader as an example of the work machine to which the present invention is applied.

FIG. 26 is a side elevational view of a wheel loader as an example of the work machine to which the present invention is applied. In FIG. 26, the wheel loader, denoted by 430, includes a machine body 431 and a multi-joint hydraulic work device 450 mounted on a front portion of the machine body 431. The machine body 431 is of the articulated steering type (the bendable type) and includes a front machine body (front frame) 431a with left and right wheels 410 (front wheels 410a) and a rear machine body (rear frame) 431b with left and right wheels 410 (rear wheels 410b), the front machine body 431a and the rear machine body 431b being coupled to each other by a central joint 464. Though not illustrated in FIG. 26, steering cylinders (hydraulic actuators) are disposed on left and right sides of the central joint 464 and couple the front machine body 431a and the rear machine body 431b to each other.

The hydraulic work device 450 includes a plurality of front members (lift arms 441 and a bucket 442) that are angularly movably coupled to each other, and a lift cylinder 452 (hydraulic actuator) and a bucket cylinder 451 (hydraulic actuator) that are extended and contracted to drive the lift arms 441 and the bucket 442. The lift arms 441 and the lift cylinders 452 are disposed on left and right sides of the front machine body 431a. In FIG. 22, only the lift arm 441 and the lift cylinder 452 on the left side of the machine body are illustrated, whereas those on the right side of the machine body are omitted from illustration though they will be described.

The lift arms 441 are angularly moved upwardly and downwardly (elevated and lowered) as the lift cylinders 452 are extended and contracted. The bucket 442 is angularly moved upwardly and downwardly (for dumping and crowding motion) as the bucket cylinder 451 is extended and contracted. The wheel loader 430 illustrated in FIG. 22 employs a Z-link mechanism (a bell crank mechanism) for actuating the bucket 442. The link mechanism includes the bucket cylinder 451.

A cabin 436 houses therein an operation lever, not depicted, for operating the hydraulic work device 450, a forward/reverse switch, not depicted, as a device for switching between forward movement (F) and reverse movement (R) in travelling directions of the machine body 431 (a forward/reverse switching device), an accelerator pedal (not depicted) for instructing the machine body 431 to accelerate, a brake petal (not depicted) for instructing the machine body 431 to decelerate, a steering wheel (not depicted) for steering the machine body 431 in leftward and rightward traveling directions, and so on. When the steering wheel, not depicted, disposed in the cabin 436 is turned, the rear machine body 431b and the front machine body 431a are bent (turned) about the central joint 464 as the steering cylinders are extended and contracted.

The cabin 436 is mounted on a front portion of the rear machine body 431b, and an engine compartment 437 is mounted on a rear portion of the rear machine body 431b. Though not depicted, the engine compartment 437 houses therein a diesel engine as a prime mover, a hydraulic pump driven by the diesel engine, control valves for controlling the flow rates and directions of oil supplied under pressure from the hydraulic pump to the hydraulic actuators, propulsive hydraulic motors connected to the wheels 410 through speed reducers, which may be termed as a propulsive device including the wheels 410, and so on.

The present invention is also applicable to the wheel loader 430 constructed as described above, in the same manner as with the hydraulic excavator 1. The front work implement 6, the machine body (the upper swing structure 3 and the lower track structure 2), the cabin, etc. of the hydraulic excavator 1 as the work machine correspond respectively to the hydraulic work device 450, the machine body 431, the wheels 410, the cabin 436, etc. of the wheel loader 430 also as the work machine.

Then, the worker proximity notification system according to the present invention is applied to the wheel loader 430 thus constructed. Specifically, posture sensors 475A and 475B for acquiring posture information of the respective front members (the lift arms 441 and the bucket 442) of the hydraulic work device 450 are disposed on the front members. The posture sensors 475A and 475B may be, for example, inertial measurement units (IMUs) for measuring angular velocities and accelerations of the front members on which they are installed. A magnetic field generating device 421 and a GNSS receiving device 550 for outputting positional information of the three-dimensional position of the wheel loader 430 are disposed on an upper portion of the machine body 431. A radio-wave receiving section 426 for receiving a radio-wave signal 140 sent from a worker tag 40 is mounted on an upper portion of the cabin 436, for example.

Furthermore, the wheel loader 430 to which the present invention is applied offers the same advantages as those of the hydraulic excavator 1 to which the present invention is applied, by incorporating components equivalent to the tag detector 20 (including the magnetic field generating device 421 of the wheel loader 430), the operation state detecting device 70, the notification device 80, and the controller 60 incorporated in the hydraulic excavator 1.

Features of the present embodiment constructed as described above will be described below.

(1) In the above embodiment, a work machine, e.g., a hydraulic excavator 1, having a machine body with a propulsive device, e.g., a lower track structure 2 and a upper swing structure 3, a multi-joint work implement, e.g., a front work implement 6, mounted on the machine body and including a plurality of front members, e.g., a boom 6A, a arm 6B, and a bucket 6C, that are angularly movably interconnected, and an operating device, e.g., an operation lever device 5, for outputting operating signals for operating the work implement, includes a GNSS receiving device 50 mounted on the machine body for acquiring positional information of the work machine, at least one magnetic field generating device 21 fixed to the machine body at a predetermined position, for generating a magnetic field signal 120 including a magnetic field ID for identifying a source for generating the magnetic field signal, a tag information receiving device 22 for receiving a radio-wave signal sent from at least one worker tag 40 carried by the operator of the work machine and a worker working outside of the work machine and having a GNSS receiving section 45 for acquiring positional information of the worker tag, the worker tag 40 being responsive to the magnetic field signal generated by the magnetic field generating device for sending the radio-wave signal 140 that includes at least the magnetic field ID included in the received magnetic field signal, a tag ID for allowing the worker tag that has received the magnetic field signal to identify itself, and positional information of the worker tag, a detecting device controller 23 for controlling the magnetic field generating device with a detection command, acquiring information included in the radio-wave signal received by the tag information receiving device, and outputting the acquired information as detected tag information, and a controller 60 for determining a detection target area 230 where the position of a worker tag with respect to the work machine is a detection target, and a proximity notification target area 280 where the proximity of a worker tag is a proximity notification target in the detection target area, calculating the position of a worker tag based on the positional information of the work machine, the positional information of the worker tag, the detected tag information acquired by the tag detecting device control section, and the detection target area, and generating a notification command and outputting the generated notification command to a notification device 80 to notify the operator of the work machine of the detection of the worker tag in case the worker tag is detected in the proximity notification target area.

Consequently, the proximity of a worker to the work machine can be detected accurately and the operator is prevented from being excessively alerted.

(2) Furthermore, according to the above embodiment, in the work machine of (1), the controller 60 calculates the position of the worker tag with respect to the work machine using the positional information of the work machine acquired by the GNSS receiving device and the positional information of the worker tag included in the detected tag information output from the tag detecting device control section, evaluates the likelihood of the position of the worker tag on the basis of the detection target area, and calculates the position of the worker tag on the basis of an evaluated result.

(3) Furthermore, according to the above embodiment, in the work machine of (2), the worker tag 40 sends a radio-wave signal including positioning quality information representing an index of the accuracy and reliability of the positional information of the worker tag acquired by the GNSS receiving section, in addition to the magnetic field ID included in the received magnetic field signal, the tag ID for allowing the worker tag that has received the magnetic field signal to identify itself, and the positional information of the worker tag, the tag detecting device control section acquires information including at least the tag ID, the positional information of the worker tag, the magnetic field ID, and the positioning quality information, as information included in the radio-wave signal received by the tag information receiving device, and outputs the acquired information as the detected tag information, and the GNSS receiving device outputs, in addition to the positional information of the work machine, the positioning quality information representing the index of the accuracy and reliability of the positional information of the work machine acquired by the GNSS receiving section.

(4) Furthermore, according to the above embodiment, in the work machine of (2), in case the position of the worker tag with respect to the work machine is within the detection target area, the controller 60 decides that the likelihood of the position of the worker tag is high and outputs the position of the worker tag as a worker presence area, in case the position of the worker tag with respect to the work machine is outside of the detection target area, the controller 60 decides that the likelihood of the position of the worker tag is low and outputs the detection target area as the worker presence area, and in case it is decided that at least one of the GNSS receiving device and the GNSS receiving section of the worker tag has not acquired positional information from the positional information of the work machine that is output from the GNSS receiving device and the positional information of the worker tag included in the detected tag information that is acquired by the tag detecting device control section, the controller 60 uses the detection target rea as the worker presence area.

(5) Furthermore, according to the above embodiment, the work machine of (1) includes an operation state detecting device 70 for detecting a working state of the work machine, in which the controller 60 determines the detection target area and the proximity notification target area on the basis of a detected result from the operation state detecting device, outputs the detection command including information of the detection target area to the tag detecting device control section, generates the notification command according to the detected result from the operation state detecting device and outputs the notification command to the notification device.

(6) Furthermore, according to the above embodiment, in the work machine of (5), the machine body has a lower track structure 2 and an upper swing structure 3 swingably mounted on the lower track structure, the multi-joint work implement having a proximal end mounted on the upper swing structure, the operation state detecting device 70 includes a posture sensor 71 for detecting a posture of the work implement and a machine operation state sensor 72 that detects an operation state of the work machine, and the controller 60 calculates a turning radius that represents distance from a center of swinging motion of the upper swing structure of the work machine with respect to the lower track structure to a farthest end of the work implement, determines the operation state of the work machine on the basis of a detected result from the operation state detecting device, and determines the detection target area and the proximity notification target area using the calculated turning radius and the determined operation state of the work machine.

(7) Furthermore, according to the above embodiment, in the work machine of (1), the notification device 80 includes a display device 81 for indicating the position of the worker tag and the proximity thereof to the work machine through visual information on the basis of a display command as one type of the notification command and an alerting device 82 for indicating the proximity of the worker tag to the work machine through audio information on the basis of an alert command as another type of the notification command, and the controller 60 generates the display command for displaying the detection target area and the position of the worker tag and outputs the display command to the display device, and generates and outputs the alert command to the alerting device in case the worker tag is present in the proximity notification target area.

<Addendum>

Note that, in the above embodiment, a hydraulic excavator and a wheel loader have been described by way of example as a work machine having a work arm. However, the present invention is also applicable to other work machines insofar as they are a work machine having a work arm. In the above embodiment, a hydraulic excavator and a wheel loader that are of the general type that actuates a hydraulic pump with a prime mover such as an engine or the like have been described by way of example. However, the present invention is also applicable to hybrid hydraulic excavators that actuate a hydraulic pump with an engine and an electric motor and to electrically operated hydraulic excavators and wheel loaders that actuate a hydraulic pump with an electric motor alone.

Furthermore, the present invention is not limited to the above embodiment, but covers various modifications and combinations within a range not deviating from the scope of the invention. Moreover, the present invention is not limited to arrangements including all the structures described in the above embodiment, but includes arrangements in which some of the structures are deleted. The above structures, functions, and so on may partly or wholly be realized by designing them with integrated circuits, for example. The above structures, functions, and so on may be software-implemented by programs for realizing the functions, interpreted and executed by a processor.

DESCRIPTION OF REFERENCE CHARACTERS

1: Hydraulic excavator
2: Lower track structure
3: Upper swing structure
4: Cabin
5: Operation lever device
6: Front work implement
6A: Boom
6B: Arm
6C: Bucket
7: Engine key switch
8: Lock lever
10: Worker proximity notification system
11: Icon
11a, 11b: Crawler frame
12a, 12b: Crawler
13a, 13b: Propulsive hydraulic motor
16A: Boom cylinder
16B: Arm cylinder
16C: Bucket cylinder
20: Tag detector
21, 21A, 21B: Magnetic field generating device
22: Tag information receiving device
23: Tag detecting device control section
24: Magnetic field signal generating section
25: Magnetic field generating section
26: Radio-wave receiving section
27: Tag information extracting section
28: Magnetic field generation commanding section
29: Detected information output section
31: Swing frame
32: Swing hydraulic motor
33: Engine
34: Hydraulic pump
35: Control valve
40: Worker tag
41: Magnetic field detecting section
42: Output information generating section
43: Radio-wave transmitting section
45: GNSS receiving section
50: GNSS receiving device
51: GNSS reception antenna
52: GNSS position information generating section
60: Controller
60A: Processor
60B: Storage section
61: Detection alert area determining section
61A: Turning radius computing section
61B: Operation state determining section
61C: Detection alert area computing section
62: Worker position calculating section
62A: Worker position computing section
62B: Worker position evaluating section
63: Notification command generating section
70: Operation state detecting device
71: Posture sensor
72: Machine operation state sensor
75A to 75C: Posture sensor
77: Key state detection sensor
78: Lock state detection sensor
79: Lever operation amount sensor
80: Notification device
81: Display device
82: Alerting device
650: Alert display
120: Magnetic field signal
140: Radio-wave signal
221: Magnetic field detectability area
230, 230A, 230B: Detection target area
240, 240A: Worker presence area
280: Proximity notification target area
321: Magnetic field generating device installation position information storage section
340: Worker information storage section
350: GNSS receiving device installation position information storage section
410: Wheel
410a: Front wheel
410b: Rear wheel
421: Magnetic field generating device
430: Wheel loader
431: Machine body
431a: Front machine body (front frame)
431b: Rear machine body (rear frame)
436: Cabin
436: Cabin
437: Engine compartment
441: Lift arm
442: Bucket
450: Hydraulic work device
451: Bucket cylinder
452: Lift cylinder
464: Central joint
475A, 475B: Posture sensor
550: GNSS receiving device

The invention claimed is:

1. A work machine having a machine body with a propulsive device, a multi-joint work implement mounted on the machine body and including a plurality of front members that are angularly movably interconnected, and an operating device for outputting operating signals for operating the work implement, the work machine comprising:
- a GNSS receiving device mounted on the machine body for acquiring positional information of the work machine;
- at least one magnetic field generating device fixed to the machine body at a predetermined position, for generating a magnetic field signal including a magnetic field ID for identifying a source for generating the magnetic field signal;
- a tag information receiving device for receiving a radio-wave signal sent from at least one worker tag carried by the operator of the work machine and a worker working outside of the work machine and having a GNSS receiving section for acquiring positional information of the worker tag, the worker tag being responsive to the magnetic field signal generated by the magnetic field generating device for sending the radio-wave signal that includes at least the magnetic field ID included in the received magnetic field signal, a tag ID for allowing the worker tag that has received the magnetic field signal to identify itself, and positional information of the worker tag;
- a tag detecting device controller for controlling the magnetic field generating device with a detection command, acquiring information included in the radio-wave signal received by the tag information receiving device, and outputting the acquired information as detected tag information; and
- a controller for determining a detection target area where a position of a worker tag with respect to the work machine is a detection target, and a proximity notification target area where proximity of a worker tag is a proximity notification target in the detection target area, calculating the position of a worker tag based on the positional information of the work machine, the positional information of the worker tag, the detected tag information acquired by the tag detecting device control section, and the detection target area, and generating a notification command and outputting the generated notification command to a notification device to notify the operator of the work machine of the detection of the worker tag in case the worker tag is detected in the proximity notification target area.

2. The work machine according to claim 1, wherein
the controller calculates the position of the worker tag with respect to the work machine using the positional information of the work machine acquired by the GNSS receiving device and the positional information of the worker tag included in the detected tag information output from the tag detecting device control section, evaluates the likelihood of the position of the worker tag on a basis of the detection target area, and calculates the position of the worker tag on a basis of an evaluated result.

3. The work machine according to claim 2, wherein
the worker tag sends a radio-wave signal including positioning quality information representing an index of accuracy and reliability of the positional information of the worker tag acquired by the GNSS receiving section, in addition to the magnetic field ID included in the received magnetic field signal, the tag ID for allowing the worker tag that has received the magnetic field signal to identify itself, and the positional information of the worker tag, the tag detecting device control section acquires information including at least the tag ID, the positional information of the worker tag, the magnetic field ID, and the positioning quality information, as information included in the radio-wave signal received by the tag information receiving device, and outputs the acquired information as the detected tag information, and
the GNSS receiving device outputs, in addition to the positional information of the work machine, the positioning quality information representing the index of the accuracy and the reliability of the positional information of the work machine acquired by the GNSS receiving section.

4. The work machine according to claim 2, wherein
in case the position of the worker tag with respect to the work machine is within the detection target area, the controller decides that the likelihood of the position of the worker tag is high and outputs the position of the worker tag as a worker presence area,
in case the position of the worker tag with respect to the work machine is outside of the detection target area, the controller decides that the likelihood of the position of the worker tag is low and outputs the detection target area as the worker presence area, and
in case it is decided that at least one of the GNSS receiving device and the GNSS receiving section of the worker tag has not acquired positional information from the positional information of the work machine that is output from the GNSS receiving device and the positional information of the worker tag included in the detected tag information that is acquired by the tag detecting device control section, the controller uses the detection target rea as the worker presence area.

5. The work machine according to claim 1, further comprising:
an operation state detecting device for detecting a working state of the work machine, wherein
the controller determines the detection target area and the proximity notification target area on a basis of a detected result from the operation state detecting device, and outputs the detection command including information of the detection target area to the tag detecting device control section, and
generates the notification command according to the detected result from the operation state detecting device and outputs the notification command to the notification device.

6. The work machine according to claim 5, wherein
the machine body has a lower track structure and an upper swing structure swingably mounted on the lower track structure, the multi-joint work implement having a proximal end mounted on the upper swing structure,
the operation state detecting device includes
- a posture sensor for detecting a posture of the work implement, and
- a machine operation state sensor that detects an operation state of the work machine, and the controller,
calculates a turning radius that represents distance from a center of swinging motion of the upper swing structure of the work machine with respect to the lower track structure to a farthest end of the work implement,
determines the operation state of the work machine on a basis of a detected result from the operation state detecting device, and determines the detection target area and the proximity notification target area using the calculated turning radius and the determined operation state of the work machine.

7. The work machine according to claim 1, wherein the notification device includes
- a display device for indicating the position of the worker tag and the proximity thereof to the work machine through visual information on a basis of a display command as one type of the notification command, and
- an alerting device for indicating the proximity of the worker tag to the work machine through audio information on a basis of an alert command as another type of the notification command, and the controller generates the display command for displaying the detection target area and the position of the worker tag and outputs the display command to the display device, and generates and outputs the alert command to the alerting device in case the worker tag is present in the proximity notification target area.

\* \* \* \* \*